(12) United States Patent
Eshima et al.

(10) Patent No.: US 11,244,145 B2
(45) Date of Patent: Feb. 8, 2022

(54) INFORMATION PROCESSING APPARATUS, INFORMATION PROCESSING METHOD, AND RECORDING MEDIUM

(71) Applicant: SONY CORPORATION, Tokyo (JP)

(72) Inventors: Masashi Eshima, Chiba (JP); Akihiko Kaino, Kanagawa (JP); Daiki Yamanaka, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/651,383

(22) PCT Filed: Jul. 19, 2018

(86) PCT No.: PCT/JP2018/027121
§ 371 (c)(1),
(2) Date: Mar. 27, 2020

(87) PCT Pub. No.: WO2019/069536
PCT Pub. Date: Apr. 11, 2019

(65) Prior Publication Data
US 2020/0242335 A1    Jul. 30, 2020

(30) Foreign Application Priority Data

Oct. 5, 2017 (JP) .............................. JP2017-194815

(51) Int. Cl.
*G06K 9/00* (2006.01)
*G06T 11/60* (2006.01)

(52) U.S. Cl.
CPC ..... *G06K 9/00255* (2013.01); *G06K 9/00281* (2013.01); *G06K 9/00912* (2013.01); *G06T 11/60* (2013.01)

(58) Field of Classification Search
CPC .......... G06K 9/00255; G06K 9/00281; G06K 9/00912; G06K 9/209; G06K 9/00671;
(Continued)

(56) References Cited

U.S. PATENT DOCUMENTS 10,634,907 B1 * 4/2020 Geng .................. G02B 27/283
10,659,751 B1 * 5/2020 Briggs ...................... G06T 7/55
(Continued)

FOREIGN PATENT DOCUMENTS

CN         107533370 A     1/2018
EP         3291052 A1      3/2018
(Continued)

OTHER PUBLICATIONS

Niebner., et al., "Real-time 3D Reconstruction at Scale using Voxel Hashing", ACM Transactions on Graphics, vol. 32, No. 6, Nov. 2013, 11 pages.
(Continued)

*Primary Examiner* — Wesley J Tucker
(74) *Attorney, Agent, or Firm* — Chip Law Group

(57) ABSTRACT

An information processing apparatus includes an estimating unit that estimates a normal on at least a part of a face of an object in a real space on the basis of polarization information corresponding to a detection result of each of a plurality of beams of polarized light acquired by a polarization sensor and having different polarization directions and a control unit that controls output of notification information for guiding a change in a position in the real space according to an estimation result of the normal.

16 Claims, 15 Drawing Sheets

(58) Field of Classification Search
CPC ........... G06T 11/60; G06T 2207/10028; G06T 2207/30244; G06T 7/50; G06T 7/70; G06T 19/00
See application file for complete search history.

(56) References Cited

U.S. PATENT DOCUMENTS

| | | |
|---|---|---|
| 2016/0210754 A1 | 7/2016 | Ida et al. |
| 2016/0261844 A1* | 9/2016 | Kadambi ............... G01B 11/24 |
| 2017/0103280 A1 | 4/2017 | Kusumi et al. |
| 2017/0206704 A1* | 7/2017 | Inoue ...................... G06T 11/60 |
| 2018/0107108 A1 | 4/2018 | Nakatani et al. |
| 2020/0143554 A1* | 5/2020 | Toldo ..................... G06T 7/521 |
| 2020/0211275 A1* | 7/2020 | Eshima .................... G06T 7/55 |
| 2020/0393689 A1* | 12/2020 | Wada .................. G06K 9/4661 |
| 2021/0088792 A1* | 3/2021 | Lee ..................... G02B 27/283 |

FOREIGN PATENT DOCUMENTS

| | | |
|---|---|---|
| JP | 2016-133396 A | 7/2016 |
| JP | 2017-072499 A | 4/2017 |
| JP | 2017-135528 A | 8/2017 |
| WO | 2016/174915 A1 | 11/2016 |

OTHER PUBLICATIONS

Steinbrucker, et al., "Volumetric 3D mapping in real-time on a CPU", IEEE International Conference on Robotics and Automation (ICRA), Sep. 29, 2014, 08 pages.

Extended European Search Report of EP Application No. 18864610.3, dated Oct. 5, 2020, 06 pages.

Cui, et al., "Polarimetric Multi-view Stereo", IEEE, Conference on Computer Vision and Pattern Recognition (CVPR), Nov. 9, 2017, pp. 369-378.

Kadambi, et al., "Polarized 3D: High-Quality Depth Sensing with Polarization Cues", IEEE, International Conference on Computer Vision (ICCV), Dec. 7, 2015, pp. 3370-3378.

Yang, et al., "Polarimetric Dense Monocular SLAM", IEEE, Conference on Computer Vision and Pattern Recognition, 2018, pp. 3857-3866.

International Search Report and Written Opinion of PCT Application No. PCT/JP2018/027121, dated Sep. 25, 2018, 09 pages of ISRWO.

* cited by examiner

INFORMATION PROCESSING APPARATUS, INFORMATION PROCESSING METHOD, AND RECORDING MEDIUM

CROSS REFERENCE TO RELATED APPLICATIONS

This application is a U.S. National Phase of International Patent Application No. PCT/JP2018/027121 filed on Jul. 19, 2018, which claims priority benefit of Japanese Patent Application No. JP 2017-194815 filed in the Japan Patent Office on Oct. 5, 2017. Each of the above-referenced applications is hereby incorporated herein by reference in its entirety.

TECHNICAL FIELD

The present disclosure relates to an information processing apparatus, an information processing method, and a recording medium.

BACKGROUND ART

In recent years, with the advancement of an image recognition technology, a position, a posture, a shape, and the like, of an object in a real space (hereinafter also referred to as a "real object") on the basis of an image captured by an image capturing unit such as a digital camera and the like have become capable of being three-dimensionally estimated (or measured). Furthermore, by using such an estimation result, it has also become possible to reproduce (reconstruct) a three-dimensional shape of the real object as a model by a polygon and the like. For example, Non-Patent Document 1 and Non-Patent Document 2 disclose examples of a technology of reproducing a three-dimensional shape of an object as a model.

Furthermore, it has also become possible to estimate (recognize) a position or a posture (that is, a self-position), in the real space, of a predetermined viewpoint such as an image capturing unit and the like that capture an image of the real object by applying the technology as described above.

CITATION LIST

Non-Patent Document

Non-Patent Document 1: Matthias Neibner et al., "Real-time 3D Reconstruction at Scale using Voxel Hashing", ACM Transactions on Graphics (TOG), 2013, [searched on Aug. 11, 2017], Internet <https://graphics.stanford.edu/~niessner/papers/2013/4hashing/niessner2013hashing.pdf>

Non-Patent Document 2: Frank Stenbrucker et al., "Volumetric 3D Mapping in Real-Time on a CPU", ICRA, 2014, [searched on Aug. 11, 2017], Internet <http://citeseerx.ist.psu.edu/viewdoc/download?doi=10.1.1.601.1521&rep=rep1&type=pdf>

SUMMARY OF THE INVENTION

Problems to be Solved by the Invention

However, in a situation of recognizing the object, such as a case of estimating the position, the posture, and the shape of the object in the real space, and the like, a recognition rate of the object may decrease, and furthermore, it may be difficult to recognize the object with high accuracy, depending on an acquisition condition of information used for the recognition.

Therefore, the present disclosure proposes a technology capable of acquiring information used for recognizing an object in a real space in a more suitable manner.

Solutions to Problems

According to the present disclosure, there is provided an information processing apparatus including: an estimating unit that estimates a normal on at least a part of a face of an object in a real space on the basis of polarization information corresponding to a detection result of each of a plurality of beams of polarized light acquired by a polarization sensor and having different polarization directions; and a control unit that controls output of notification information for guiding a change in a position in the real space according to an estimation result of the normal.

Furthermore, according to the present disclosure, there is provided an information processing method, by a computer, including: estimating a normal on at least a part of a face of an object in a real space on the basis of polarization information corresponding to a detection result of each of a plurality of beams of polarized light acquired by a polarization sensor and having different polarization directions; and controlling output of notification information for guiding a change in a position in the real space according to an estimation result of the normal.

Furthermore, according to the present disclosure, there is provided a recording medium in which a program is recorded, the program for causing a computer to execute: estimating a normal on at least a part of a face of an object in a real space on the basis of polarization information corresponding to a detection result of each of a plurality of beams of polarized light acquired by a polarization sensor and having different polarization directions; and controlling output of notification information for guiding a change in a position in the real space according to an estimation result of the normal.

Effects of the Invention

As described above, according to the present disclosure, a technology capable of acquiring information used for recognizing an object in a real space in a more suitable manner is provided.

Note that the effect described above is not necessarily restrictive, and any effect set forth in the present specification or other effects that can be grasped from the present specification may be accomplished together with or instead of the effect described above.

MODE FOR CARRYING OUT THE INVENTION

Figure 1:
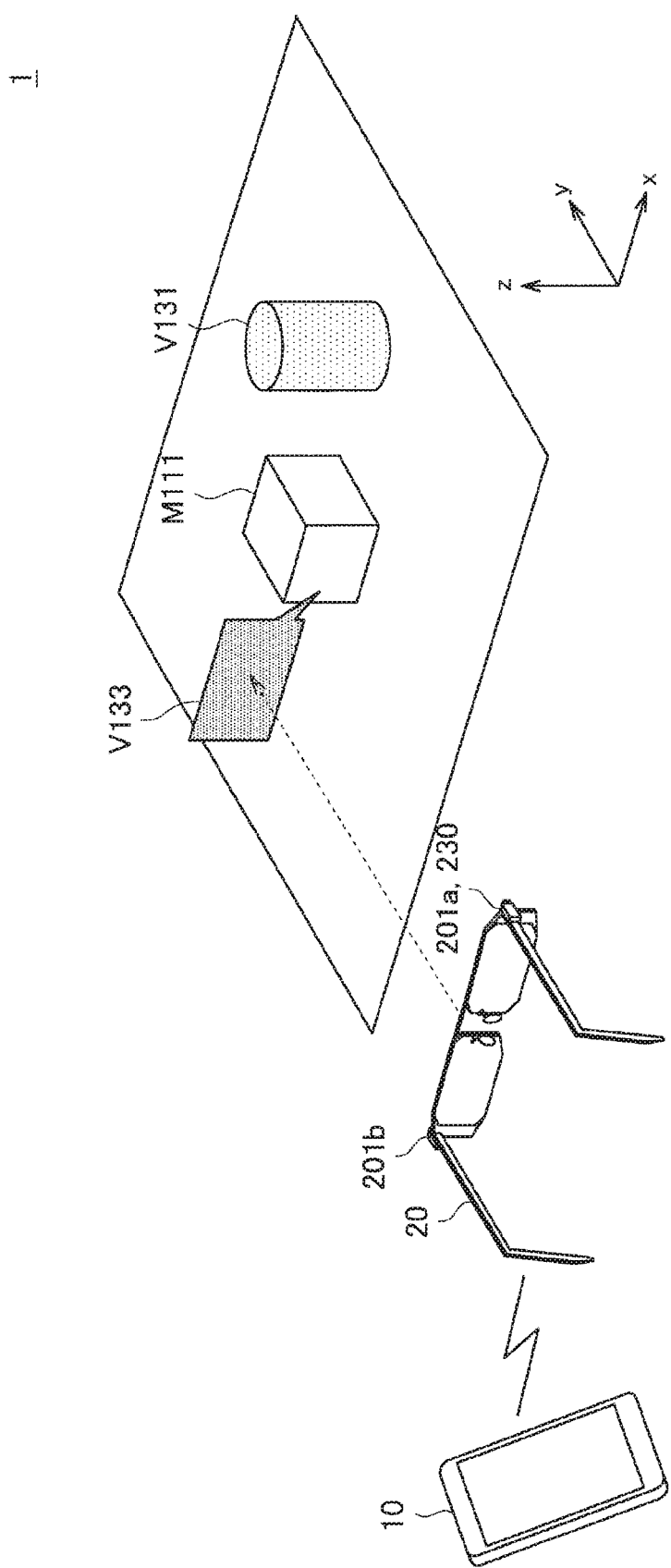
FIG. 1 is an explanatory diagram for describing an example of a schematic configuration of an information processing system according to an embodiment of the present disclosure.

Hereinafter, preferred embodiments of the present disclosure will be described in detail with reference to the accompanying drawings. Note that in the present specification and the drawings, components having substantially the same functional configuration will be denoted by the same reference numerals and an overlapping description will be omitted.

Note that a description will be given in the following order.

1. Schematic configuration
1.1. System configuration
1.2. Configuration of input/output apparatus
2. Study on recognition of object in real space
3. Technical feature
3.1. Functional configuration
3.2. Guidance example according to degree of reliability of polarization normal
3.3. Guidance examples for resolving indefiniteness of polarization normal
3.4. Example of notification information
4. Hardware configuration
5. End <<1. Schematic Configuration>>
<1.1. System Configuration>

First, an example of a schematic configuration of an information processing system according to an embodiment of the present disclosure will be described with reference to FIG. 1. FIG. 1 is an explanatory diagram for describing an example of a schematic configuration of an information processing system according to an embodiment of the present disclosure, and illustrates an example of a case of presenting various contents to a user by applying a so-called an augmented reality (AR) technology.

In FIG. 1, reference numeral m111 schematically denotes an object (for example, a real object) located in a real space. Furthermore, reference numerals v131 and v133 schematically denote virtual contents (for example, virtual objects) presented so as to be superimposed in the real space. That is, the information processing system 1 according to the present embodiment superimposes a virtual object on an object in the real space such as the real object m111 and the like and presents the virtual object superimposed on the real object to a user, on the basis of, for example, the AR technology. Note that in FIG. 1, in order to make a feature of the information processing system according to the present embodiment easier to understand, both of the real object and the virtual object are presented together.

As illustrated in FIG. 1, the information processing system 1 according to the present embodiment includes an information processing apparatus 10 and an input/output apparatus 20. The information processing apparatus 10 and the input/output apparatus 20 are configured to be able to transmit/receive information to/from each other through a predetermined network. Note that a type of network connecting the information processing apparatus 10 and the input/output apparatus 20 to each other is not particularly limited. As a specific example, the network may be configured by a so-called wireless network such as a network based on a Wi-Fi (registered trademark) standard. Furthermore, as another example, the network may be configured by the Internet, a dedicated line, a local area network (LAN), a wide area network (WAN), or the like. Furthermore, the network may include a plurality of networks, and at least a part of the network may be configured as a wired network.

The input/output apparatus 20 has a configuration for performing acquisition of various input information or presentation of various output information to a user holding the input/output apparatus 20. Furthermore, the presentation of the output information by the input/output apparatus 20 is controlled by the information processing apparatus 10 on the basis of the input information acquired by the input/output apparatus 20. For example, the input/output apparatus 20 acquires information (for example, a captured image of the real space) for recognizing the real object m111 as input information, and outputs the acquired information to the information processing apparatus 10. The information processing apparatus 10 recognizes a position or a posture of the real object m111 in the real space on the basis of the information acquired from the input/output apparatus 20, and presents the virtual objects v131 and v133 to the input/output apparatus 20 on the basis of a recognition result. With such control, the input/output apparatus 20 can present the virtual objects v131 and v133 to the user so that the virtual objects v131 and v133 are superimposed on the real object m111 on the basis of the so-called AR technology.

Furthermore, the input/output apparatus 20 is configured as, for example, a so-called head-mounted device used by the user in a state of being mounted on at least a part of a head of the user, and may be configured to be able to detect a line-of-sight of the user. On the basis of such a configuration, the information processing apparatus 10 may specify a desired target as an operation target in a case where it is recognized that the user is gazing at the desired target (for example, the real object m111, the virtual objects v131 and v133, or the like) on the basis of a detection result of the line-of-sight of the user by the input/output apparatus 20. Furthermore, the information processing apparatus 10 may specify a target toward which the line-of-sight of the user is directed as an operation target, with a predetermined operation on the input/output apparatus 20 as a trigger. In such a manner, the information processing apparatus 10 may provide various services to the user through the input/output apparatus 20 by specifying the operation target and executing processing associated with the operation target.

Here, an example of a more specific configuration for the information processing system according to the present embodiment to recognize the object (real object) in the real space as described above will be described. As illustrated in FIG. 1, the input/output apparatus 20 according to the present embodiment includes a depth sensor 201 and a polarization sensor 230.

The depth sensor 201 acquires information for estimating a distance between a predetermined viewpoint and the object (real object) located in the real space, and transmits the acquired information to the information processing apparatus 10. Note that in the following description, the information for estimating the distance between the predetermined viewpoint and the real object, acquired by the depth sensor 201 is also referred to as "depth information".

For example, in the example illustrated in FIG. 1, the depth sensor 201 is configured as a so-called stereo camera including a plurality of image capturing units 201a and 201b, and captures images of the object located in the real space from different viewpoints by the image capturing units 201a and 201b. In this case, the depth sensor 201 transmits the images captured by each of the image capturing units 201a and 201b to the information processing apparatus 10.

By using a plurality of images captured from different viewpoints in such a manner, it becomes possible to estimate (calculate) a distance between the predetermined viewpoint (for example, a position of the depth sensor 201) and a subject (that is, a real object captured in an image), for example, on the basis of a parallax between the plurality of images. Therefore, for example, it also becomes possible to generate a so-called depth map in which an estimation result of the distance between the predetermined viewpoint and the subject is mapped on an imaging plane.

Note that a configuration of a portion corresponding to the depth sensor 201 or a method of estimating the distance are not particularly limited as long as the distance between the predetermined viewpoint and the object (real object) in the real space can be estimated. As a specific example, the distance between the predetermined viewpoint and the real object may be measured on the basis of a method such as multi-camera stereo, moving parallax, time of flight (TOF), structured light, or the like. Here, the TOF is a method of obtaining an image (that is, a depth map) including a distance (depth) to the subject on the basis of a measurement result by projecting light such as infrared rays and the like to the subject (that is, the real object), and measuring a time until the projected light is reflected by the subject and returned, for every pixel. Furthermore, the structured light is a method of obtaining a depth map including a distance (depth) to the subject on the basis of a change in a pattern obtained from an image capturing result by irradiating the subject with the pattern by light such as infrared rays and the like and capturing an image of the subject. Furthermore, the moving parallax is a method of measuring a distance to the subject on the basis of a parallax even in a so-called monocular camera. Specifically, images of the subject are captured from different viewpoints by moving the camera, and the distance to the subject is measured on the basis of a parallax between the captured images. Note that at this time, the distance to the subject can be measured with higher accuracy by recognizing a moving distance and a moving direction of the camera by various sensors. Note that a configuration (for example, a monocular camera, a stereo camera, or the like) of the depth sensor 201 may change according to a method of measuring the distance.

The polarization sensor 230 detects light polarized in a predetermined polarization direction (hereinafter, also simply referred to as "polarized light") among beams of light reflected by the object located in the real space, and transmits information corresponding to a detection result of the polarized light to the information processing apparatus 10. Note that in the information processing system 1 according to the present embodiment, the polarization sensor 230 is configured to be able to detect a plurality of beams of polarized light (more preferably, three or more beams of polarized light) having different polarization directions. Furthermore, in the following description, information corresponding to a detection result of the polarized light by the polarization sensor 230 is also referred to as "polarization information".

As a specific example, the polarization sensor 230 is configured as a so-called polarization camera, and captures a polarization image based on the light polarized in the predetermined polarization direction. Here, the polarization image corresponds to information in which the polarization information is mapped on an imaging plane (in other words, an image plane) of the polarization camera. Note that in this case, the polarization sensor 230 transmits the captured polarization image to the information processing apparatus 10.

Furthermore, the polarization sensor 230 is only required to be held so as to be able to capture an image of polarized light coming from a region at least partially overlapping (ideally, a region substantially coinciding with) a region in the real space, which is an acquisition target of the information for estimating the distance by the depth sensor 201. Note that in a case where the depth sensor 201 and the polarization sensor 230 are fixed at predetermined positions, respectively, by acquiring information indicating positions of each of the depth sensor 201 and the polarization sensor 230 in the real space in advance, it is possible to treat the positions of each of the depth sensor 201 and the polarization sensor 230 as known information.

Furthermore, as illustrated in FIG. 1, the depth sensor 201 and the polarization sensor 230 are only required to be held in a common apparatus (for example, the input/output apparatus 20). In this case, for example, by calculating a relative positional relationship of the depth sensor 201 and the polarization sensor 230 with respect to the apparatus in advance, it becomes possible to estimate positions and postures of each of the depth sensor 201 and the polarization sensor 230 on the basis of a position and a posture of the apparatus.

Furthermore, the apparatus (for example, the input/output apparatus 20) in which the depth sensor 201 and the polarization sensor 230 are held may be configured to be movable. In this case, for example, by applying a technology called self-position estimation, it becomes possible to estimate the position and the posture of the apparatus in the real space.

Here, a technology called simultaneous localization and mapping (SLAM) will be described as a more specific example of a technology of estimating a position and a posture of a predetermined apparatus in the real space. The SLAM is a technology of performing self-position estimation and creation of an environment map in parallel by using an image capturing unit such as a camera and the like, various sensors, an encoder, and the like. As a more specific example, in the SLAM (particularly, visual SLAM), three-dimensional shapes of a captured scene (or subject) are sequentially reconstructed on the basis of a moving image captured by the image capturing unit. Then, by associating a reconfiguration result of the captured scene with a detection result of the position and the posture of the image capturing unit, creation of a map of the surrounding environment and estimation of the position and the posture of the image capturing unit in the environment are performed. Note that the position and the posture of the image capturing unit can be estimated as information indicating a relative change on the basis of detection results of various sensors such as an acceleration sensor, an angular velocity sensor, or the like, for example, by providing the various sensors in the apparatus in which the image capturing unit is held. Of course, as long as the position and the posture of the image capturing unit can be estimated, the method is not necessarily limited only to a method based on the detection results of the various sensors such as the acceleration sensor, the angular velocity sensor, or the like.

Furthermore, at least one of the depth sensor 201 or the polarization sensor 230 may be configured to be movable independently of the other of the depth sensor 201 or the polarization sensor 230. In this case, a position and a posture, in the real space, of the sensor itself configured to be movable are only required to be individually estimated on the basis of the technology of the self-position estimation described above, and the like.

Furthermore, the information processing apparatus 10 may acquire the depth information and the polarization information acquired by the depth sensor 201 and the polarization sensor 230 from the input/output apparatus 20. In this case, for example, the information processing apparatus 10 may recognize the object (real object) located in the real space on the basis of the acquired depth information and polarization information, and generate a model that reproduces a three-dimensional shape of the object. Note that details of processing for generating the model will be described later separately.

Furthermore, the information processing apparatus 10 may present various information to a user who uses the input/output apparatus 20 through an output unit (for example, a display and the like) of the input/output apparatus 20 according to an acquisition result of the polarization information by the polarization sensor 230. As a specific example, the information processing apparatus 10 may present notification information for performing guidance so that the polarization sensor 230 (that is, the input/output apparatus 20) moves to a position where the polarization sensor 230 can acquire polarization information for recognizing the real object in a more suitable manner, to the user (or notify the user of the notification information). Note that details of processing related to the presentation of the notification information or an example of the notification information will be described later separately.

Note that the configuration described above is merely an example, and a system configuration of the information processing system 1 according to the present embodiment is not necessarily limited only to the example illustrated in FIG. 1. As a specific example, the input/output apparatus 20 and the information processing apparatus 10 may be configured integrally with each other. Furthermore, details of configurations and processing of the input/output apparatus 20 and the information processing apparatus 10 will be described later separately.

Hereinabove, the example of the schematic configuration of the information processing system according to the embodiment of the present disclosure has been described with reference to FIG. 1.

<1.2. Configuration of Input/Output Apparatus>

Figure 2:
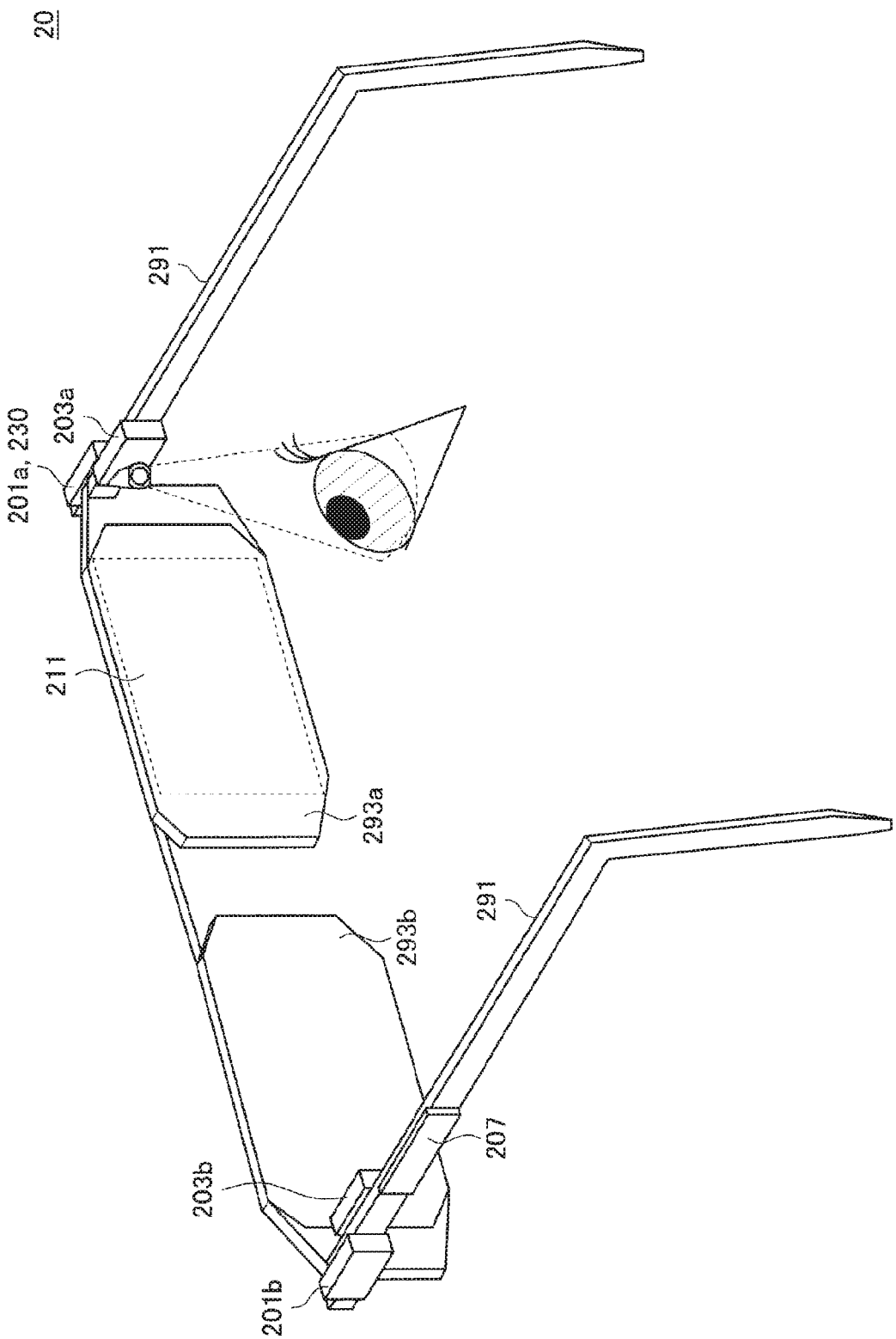
FIG. 2 is an explanatory diagram for describing an example of a schematic configuration of an input/output apparatus according to the embodiment.

Next, an example of a schematic configuration of the input/output apparatus 20 according to the present embodiment illustrated in FIG. 1 will be described with reference to FIG. 2. FIG. 2 is an explanatory diagram for describing an example of a schematic configuration of the input/output apparatus according to the present embodiment.

As described above, the input/output apparatus 20 according to the present embodiment is configured as the so-called head-mounted device used by the user in a state of being mounted on at least a part of the head of the user. For example, in the example illustrated in FIG. 2, the input/output apparatus 20 is configured as a so-called eyewear-type (glasses-type) apparatus, and at least one of the lens 293a or 293b is configured as a transmissive display (display unit 211). Furthermore, the input/output apparatus 20 includes image capturing units 201a and 201b, a polarization sensor 230, an operation unit 207, and a holding unit 291 corresponding to a frame of glasses. Furthermore, the input/output apparatus 20 may include image capturing units 203a and 203b. Note that in the following, various descriptions are given assuming that the input/output apparatus 20 includes the image capturing units 203a and 203b. The holding unit 291 holds the display unit 211, the image capturing units 201a and 201b, the polarization sensor 230, the image capturing units 203a and 203b, and the operation unit 207 in a predetermined positional relationship with the head of the user when the input/output apparatus 20 is mounted on the head of the user. Note that the image capturing units 201a and 201b and the polarization sensor 230 correspond to the image capturing units 201a and 201b and the polarization sensor 230 illustrated in FIG. 1. Furthermore, although not illustrated in FIG. 2, the input/output apparatus 20 may include a sound collecting unit for collecting a voice of the user.

Here, a more specific configuration of the input/output apparatus 20 will be described. For example, in the example illustrated in FIG. 2, the lens 293a corresponds to a right eye side lens, and the lens 293b corresponds to a left eye side lens. That is, the holding unit 291 holds the display unit 211 so that the display unit 211 (in other words, the lenses 293a and 293b) is positioned in front of eyes of the user in a case where the input/output apparatus 20 is mounted.

The image capturing units 201a and 201b are configured as so-called stereo cameras, and are each held by the holding unit 291 so as to face a direction (that is, a forward direction of the user) in which the head of the user is directed when the input/output apparatus 20 is mounted on the head of the user. At this time, the image capturing unit 201a is held near a right eye of the user, and the image capturing unit 201b is held near a left eye of the user. On the basis of such a configuration, the image capturing units 201*a* and 201*b* capture images of a subject located in front of the input/output apparatus 20 (in other words, a real object located in a real space) from different positions. Therefore, the input/output apparatus 20 can acquire the images of the subject located in front of the user, and can calculate a distance from the input/output apparatus 20 (and furthermore, a position of a viewpoint of the user) to the subject on the basis of a parallax between the images captured by each of the image capturing units 201*a* and 201*b*.

Note that, as described above, a configuration of the input/output apparatus 20 or a method of measuring the distance is not particularly limited as long as the distance between the input/output apparatus 20 and the subject can be measured.

Furthermore, the image capturing units 203*a* and 203*b* are each held by the holding unit 291 so that an eyeball of the user is located within each image capturing range when the input/output apparatus 20 is mounted on the head of the user. As a specific example, the image capturing unit 203*a* is held so that the right eye of the user is located within the image capturing range. On the basis of such a configuration, it becomes possible to recognize a direction toward which a line-of-sight of the right eye is directed on the basis of an image of an eyeball of the right eye captured by the image capturing unit 203*a* and a positional relationship between the image capturing unit 203*a* and the right eye. Similarly, the image capturing unit 203*b* is held so that the left eye of the user is located within the image capturing range. That is, it becomes possible to recognize a direction toward which a line-of-sight of the left eye is directed on the basis of an image of an eyeball of the left eye captured by the image capturing unit 203*b* and a positional relationship between the image capturing unit 203*b* and the left eye. Note that a configuration in which the input/output apparatus 20 includes both of the image capturing units 203*a* and 203*b* is illustrated in the example illustrated in FIG. 2, but only one of the image capturing unit 203*a* or 203*b* may be provided.

The polarization sensor 230 corresponds to the polarization sensor 230 illustrated in FIG. 1, and is held by the holding unit 291 so as to face the direction (that is, the forward direction of the user) in which the head of the user is directed when the input/output apparatus 20 is mounted on the head of the user. On the basis of such a configuration, the polarization sensor 230 captures a polarization image of a space in front of the eyes of the user who wears the input/output apparatus 20. Note that an installation position of the polarization sensor 230 illustrated in FIG. 2 is merely an example, and the installation position of the polarization sensor 230 is not limited as long as the polarization image of the space in front of the eyes of the user who wears the input/output apparatus 20 can be captured by the polarization sensor 230.

The operation unit 207 is a configuration for accepting an operation from the user for the input/output apparatus 20. The operation unit 207 may be configured by, for example, an input device such as a touch panel, a button, or the like. The operation unit 207 is held at a predetermined position of the input/output apparatus 20 by the holding unit 291. For example, in the example illustrated in FIG. 2, the operation unit 207 is held at a position corresponding to a temple of glasses.

Furthermore, the input/output apparatus 20 according to the present embodiment may be provided with, for example, an acceleration sensor or an angular velocity sensor (gyro sensor) to be able to detect movement of the head of the user who wears the input/output apparatus 20 (in other words, movement of the input/output apparatus 20 itself). As a specific example, the input/output apparatus 20 may recognize a change in at least any one of a position or a posture of the head of the user by detecting components in each of a yaw direction, a pitch direction, and a roll direction as the movement of the head of the user.

On the basis of the configuration as described above, the input/output apparatus 20 according to the present embodiment can recognize a change in its position or posture according to the movement of the head of the user. Furthermore, at this time, the input/output apparatus 20 can also present a virtual content (that is, a virtual object) to the display unit 211 so that the virtual content is superimposed on the real object located in the real space on the basis of a so-called AR technology. Furthermore, at this time, the input/output apparatus 20 may estimate its position and posture (that is, self-position) in the real space on the basis of, for example, the technology called the SLAM described above, and the like, and may use a result of the estimation for presenting the virtual object.

Furthermore, examples of a head mounted display (HMD) that can be applied as the input/output apparatus 20 can include a see-through type HMD, a video see-through type HMD, and a retinal projection type HMD.

The see-through type HMD holds a virtual image optical system including a transparent light guide unit and the like in front of eyes of a user and displays an image inside the virtual image optical system, using, for example, a half mirror or a transparent light guide plate. Therefore, the user who wears the see-through type HMD can make an external landscape come into sight while viewing/listening an image displayed inside the virtual image optical system. With such a configuration, the see-through type HMD can also superimpose an image of a virtual object on an optical image of the real object located in the real space according to a recognition result of at least any one of a position or a posture of the see-through type HMD on the basis of, for example, the AR technology. Note that a specific example of the see-through type HMD can include a so-called glasses-type wearable device in which a portion corresponding to a lens of glasses is configured as a virtual image optical system. For example, the input/output apparatus 20 illustrated in FIG. 2 corresponds to an example of the see-through type HMD.

In a case where the video see-through type HMD is mounted on a head or a face of a user, the video see-through type HMD is mounted so as to cover eyes of the user, such that a display unit such as a display and the like is held in front of the eyes of the user. Furthermore, the video see-through type HMD includes an image capturing unit for capturing an image of a surrounding landscape, and displays an image of a landscape in front of the user captured by the image capturing unit on a display unit. With such a configuration, it is difficult for the user who wears the video see-through type HMD to make an external landscape directly come into sight, but it becomes possible to check the external landscape by the image displayed on the display unit. Furthermore, at this time, the video see-through type HMD may superimpose a virtual object on an image of the external landscape according to a recognition result of at least any one of a position or a posture of the video see-through type HMD on the basis of, for example, the AR technology.

In the retinal projection type HMD, a projection unit is held in front of eyes of a user, and an image is projected from the projection unit toward the eyes of the user so that the image is superimposed on an external landscape. More specifically, in the retinal projection type HMD, an image is directly projected from the projection unit onto retinas of the eyes of the user, such that the image is formed on the retinas. With such a configuration, it becomes possible to view/listen a clearer video even in a case of a short-sighted or farsighted user. Furthermore, the user who wears the retinal projection type HMD can make the external landscape come into sight while viewing/listening the image projected from the projection unit. With such a configuration, the retinal projection type HMD can also superimpose an image of a virtual object on an optical image of the real object located in the real space according to a recognition result of at least any one of a position or a posture of the retinal projection type HMD on the basis of, for example, the AR technology.

Furthermore, hereinabove, an example of the configuration of the input/output apparatus 20 according to the present embodiment has been described on the assumption that the AR technology is applied, but the configuration of the input/output apparatus 20 is not necessarily limited. For example, in a case where it is assumed that a VR technology is applied, the input/output apparatus 20 according to the present embodiment may be configured as an HMD called an immersive HMD. Similarly to the video see-through type HMD, the immersive HMD is mounted so as to cover the eyes of the user, such that a display unit such as a display and the like is held in front of the eyes of the user. Therefore, it is difficult for the user who wears the immersive HMD to make an external landscape (that is, a landscape of a real world) directly come into sight, and only a video displayed on the display unit comes into sight. With such a configuration, the immersive HMD can give an immersive feeling to the user who is viewing/listening the image.

Note that the configuration of the input/output apparatus 20 described above is merely an example, and is not necessarily limited only to the configuration illustrated in FIG. 2. As a specific example, a configuration corresponding to an application or a function of the input/output apparatus 20 may be additionally provided in the input/output apparatus 20. As a specific example, as an output unit for presenting information to the user, a sound output unit (for example, a speaker and the like) for presenting a voice or a sound, an actuator for feeding back a tactile sense or a force sense, or the like, may be provided.

Hereinabove, the example of the schematic configuration of the input/output apparatus according to the embodiment of the present disclosure has been described with reference to FIG. 2.

<<2. Study on Recognition of Object in Real Space>>

Next, an example of a technology of recognizing an object (real object) in a real space and three-dimensionally estimating a position, a posture, a shape, and the like of the object (and furthermore, a technology of modeling the object) will be schematically described, and a technical problem of the information processing system according to the present embodiment will then be summarized.

As described above, in the information processing system according to the present embodiment, the object is recognized (and furthermore, the position, the posture, the shape, and the like of the object are three-dimensionally estimated) on the basis of the information corresponding to the detection result of the plurality of beams of polarized light reflected on a front surface of the object located in the real space and having different polarization directions (that is, the polarization information).

Specifically, the polarization image in which the polarization information is mapped on the image plane is captured by the polarization sensor such as the polarization camera and the like. By performing polarization imaging processing based on cosine curve fitting on an intensity of light indicated by the polarization image (that is, a light intensity of the plurality of beams of polarized light), it is possible to calculate information regarding a geometric structure of the object captured in the polarization image (hereinafter, also referred to as "geometric structure information").

Examples of the geometric structure information can include information corresponding to an amplitude and a phase obtained as a result of the cosine curve fitting described above or information regarding a normal of a front surface of the object calculated on the basis of the amplitude and the phase (hereinafter, also referred to as "normal information"). Furthermore, examples of the normal information can include information indicating a normal vector by a zenith angle and an azimuth angle, information indicating the vector in a three-dimensional coordinate system, or the like. Note that the zenith angle can be calculated from an amplitude of a cosine curve. Furthermore, the azimuth angle can be calculated from a phase of the cosine curve. Furthermore, it goes without saying that the zenith angle and azimuth angle can be converted into a three-dimensional coordinate system such as xyz and the like. Furthermore, information indicating a distribution of the normal information in which the normal information described above is mapped on the image plane of the polarization image corresponds to a so-called normal map. Furthermore, information before the polarization imaging processing described above is performed, that is, the polarization information may be used as the geometric structure information.

In such a manner, by estimating a normal direction of the front surface of the object based on the polarization information, it becomes possible to estimate a three-dimensional shape of the object. Furthermore, by using the depth information acquired by the depth sensor and the like, it becomes possible to specify a position of the front surface of the object in a depth direction. More specifically, by integrating information corresponding to the polarization information described above or the depth information described above as, for example, data such as a voxel volume (hereinafter, also referred to as a "three-dimensional space model"), it becomes possible to three-dimensionally estimate the position, the posture, the shape, and the like of the object in the real space on the basis of the three-dimensional space model. Furthermore, it becomes possible to reproduce (simulate) the three-dimensional shape of the object in the real space as a model such as a polygon mesh and the like on the basis of the three-dimensional space model.

Figure 3:
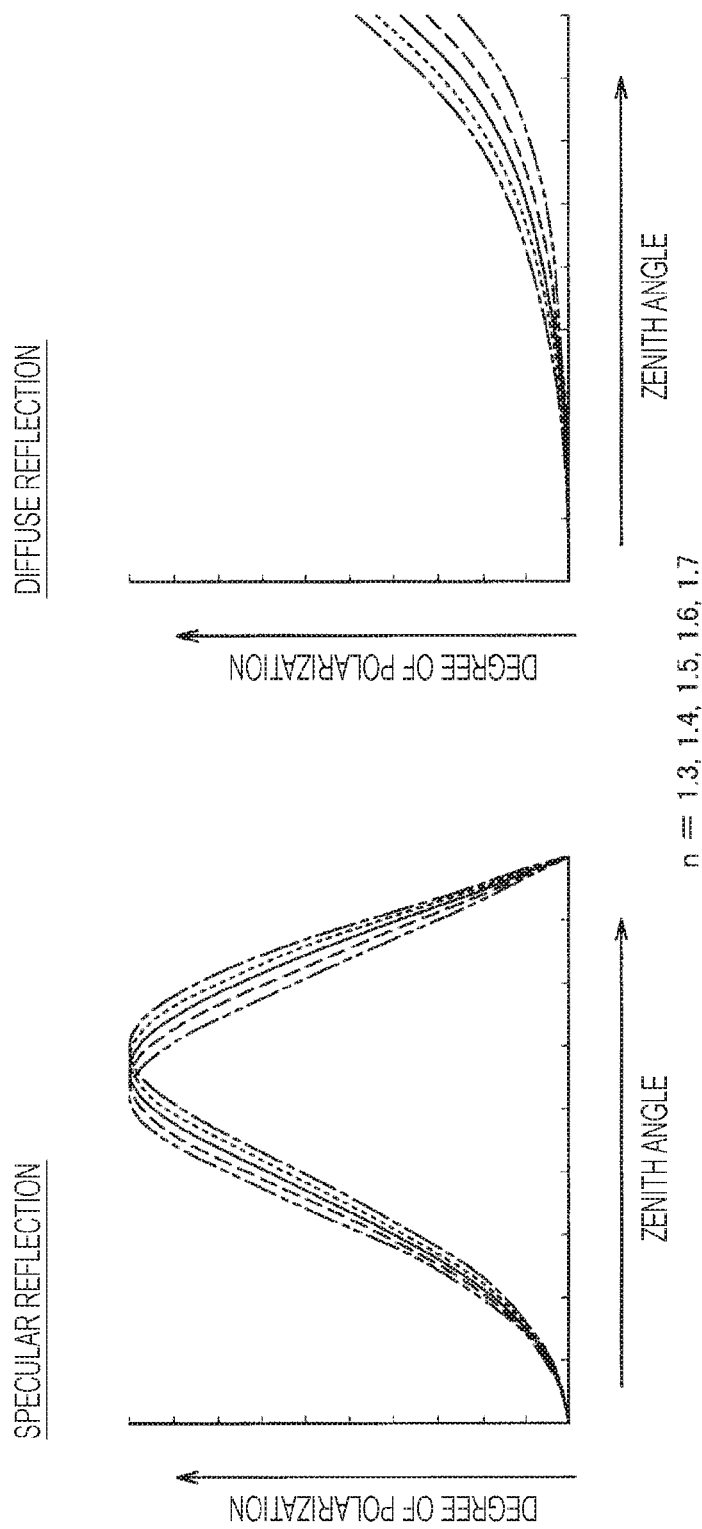
FIG. 3 is an explanatory diagram for describing an overview of a degree of reliability of polarization information.

Meanwhile, a degree of reliability of the polarization information may decrease depending on an acquisition condition of the polarization information. For example, FIG. 3 is an explanatory diagram for describing an overview of the degree of reliability of the polarization information, and illustrates an example of a relationship between a positional relationship between a front surface of an object, which is a recognition target, and the polarization sensor and a degree of polarization of the detected polarized light. Specifically, a horizontal axis in FIG. 3 indicates an angle (that is, a zenith angle with respect to the normal) formed by a direction of a normal of a face of the object, which is the recognition target, and a direction corresponding to a vector extending from the polarization sensor to the face (hereinafter, also referred to as a "Ray vector"). Note that strictly, the Ray vector corresponds to a vector extending from the polarization sensor to a position on the face corresponding to each pixel of the polarization sensor. Furthermore, a vertical axis in FIG. 3 indicates a degree of polarization of the polarized light detected by the polarization sensor. Note that graphs illustrated on the left side of FIG. 3 illustrate cases of specular reflection. Furthermore, graphs illustrated on the right side of FIG. 3 illustrate cases of diffuse reflection.

As illustrated in FIG. 3, the degree of polarization changes according to the positional relationship (that is, the zenith angle described above) between the front surface of the object, which is the recognition target, and the polarization sensor. Note that as the degree of polarization becomes higher, a proportion occupied by the polarized light, which is a detection target, in light reflected on the front surface of the object and reaching the polarization sensor becomes larger (that is, a proportion of miscellaneous light becomes smaller), and a degree of reliability of the acquired polarization information becomes thus higher.

Here, as can be seen with reference to FIG. 3, in any case of the specular reflection and the diffuse reflection, in a case where the polarization sensor directly faces the front surface of the object (that is, in a case where the zenith angle is 0 degrees), the degree of polarization becomes lower (ideally 0), and the degree of reliability of the acquired polarization information becomes thus lower. Under such a circumstance, accuracy related to estimation of the normal direction of the front surface of the object, which is the target, decreases on the basis of the acquired polarization information, and accuracy related to estimation of the position, the posture, the shape, and the like of the object (in other words, recognition of the object) may thus decrease.

Furthermore, in a case where the normal is estimated on the basis of the polarization information, indefiniteness of an estimation result (hereinafter, also referred to as "indefiniteness of the polarization normal") may become apparent. Even in such a case, accuracy related to the estimation of the position, the posture, the shape, and the like of the object, which is the target, may decrease. Note that details of the indefiniteness of the polarization normal will be described later separately.

In view of the situation as described above, the present disclosure proposes a technology capable of acquiring information used for recognizing the object in the real space, such as the polarization information described above, in a more suitable manner.

Specifically, the information processing system according to the embodiment of the present disclosure guides the user who holds an apparatus provided with the polarization sensor so that the polarization sensor is located at a position where information regarding the recognition of the object in the real space can be acquired in a more suitable manner, according to an acquisition result of the information regarding the recognition of the object in the real space.

Figure 4:
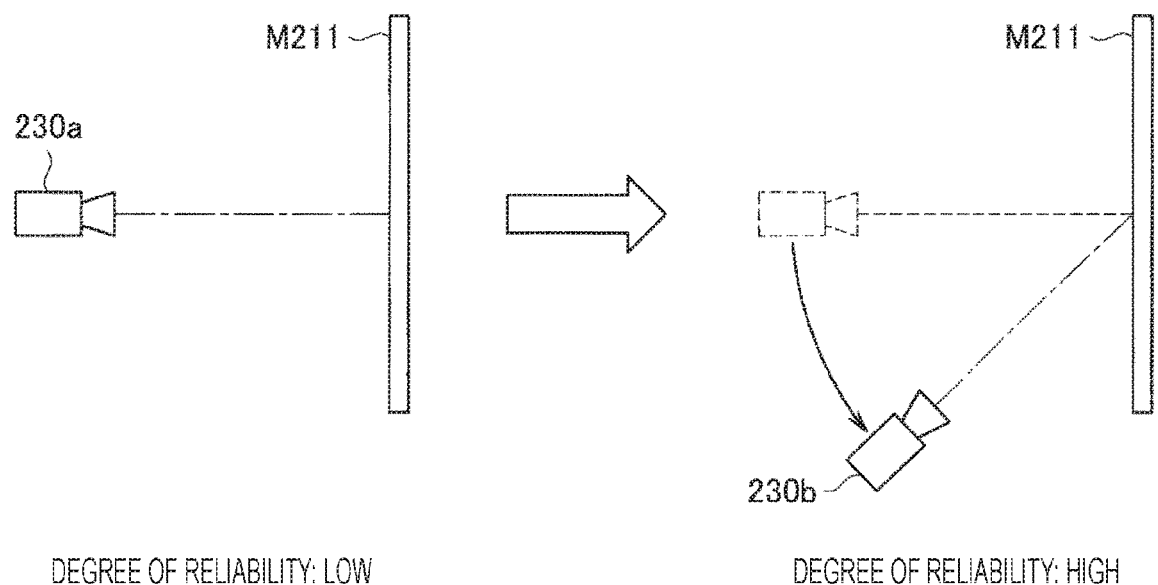
FIG. 4 is an explanatory diagram for describing an overview of the information processing system according to the embodiment.

For example, FIG. 4 is an explanatory diagram for describing an overview of the information processing system according to the present embodiment, and illustrates an example of the position where the polarization sensor can acquire the information regarding recognition of the object in the real space in a more suitable manner. In FIG. 4, reference numeral M211 schematically denotes a front surface of an object, which is a recognition target. Furthermore, reference numerals 230a and 230b schematically denote positions and postures of the polarization sensor.

Specifically, a diagram on the left side of FIG. 4 illustrates a state where the polarization sensor directly faces the front surface M211 of the object. In such a case, as described above with reference to FIG. 3, a degree of reliability of the polarization information acquired by the polarization sensor tends to become lower. In such a case, for example, as illustrated on the right side of FIG. 4, the polarization sensor moves to a position where the front surface M211 is observed from an oblique direction (that is, a position denoted by reference numeral 230b), such that it becomes possible to improve the degree of reliability of the polarization information acquired by the polarization sensor. That is, in a case of the example illustrated in FIG. 4, the information processing system according to the present embodiment may prompt the user to move by, for example, presenting notification information for performing guidance so that the polarization sensor moves from the position denoted by reference numeral 230a to the position denoted by reference numeral 230b to the user.

With such a configuration, in the information processing system according to the embodiment of the present disclosure, the user moves on the basis of the guidance, such that, for example, an effect of further improving the accuracy related to the estimation of the position, the posture, the shape, and the like of the object, which is the target (in other words, the recognition of the object) can be expected. Note that technical features of the information processing system according to the present embodiment will hereinafter be described in more detail.

<<3. Technical Feature>>

Technical features of the information processing system according to the present embodiment will hereinafter be described.

<3.1. Functional Configuration>

Figure 5:
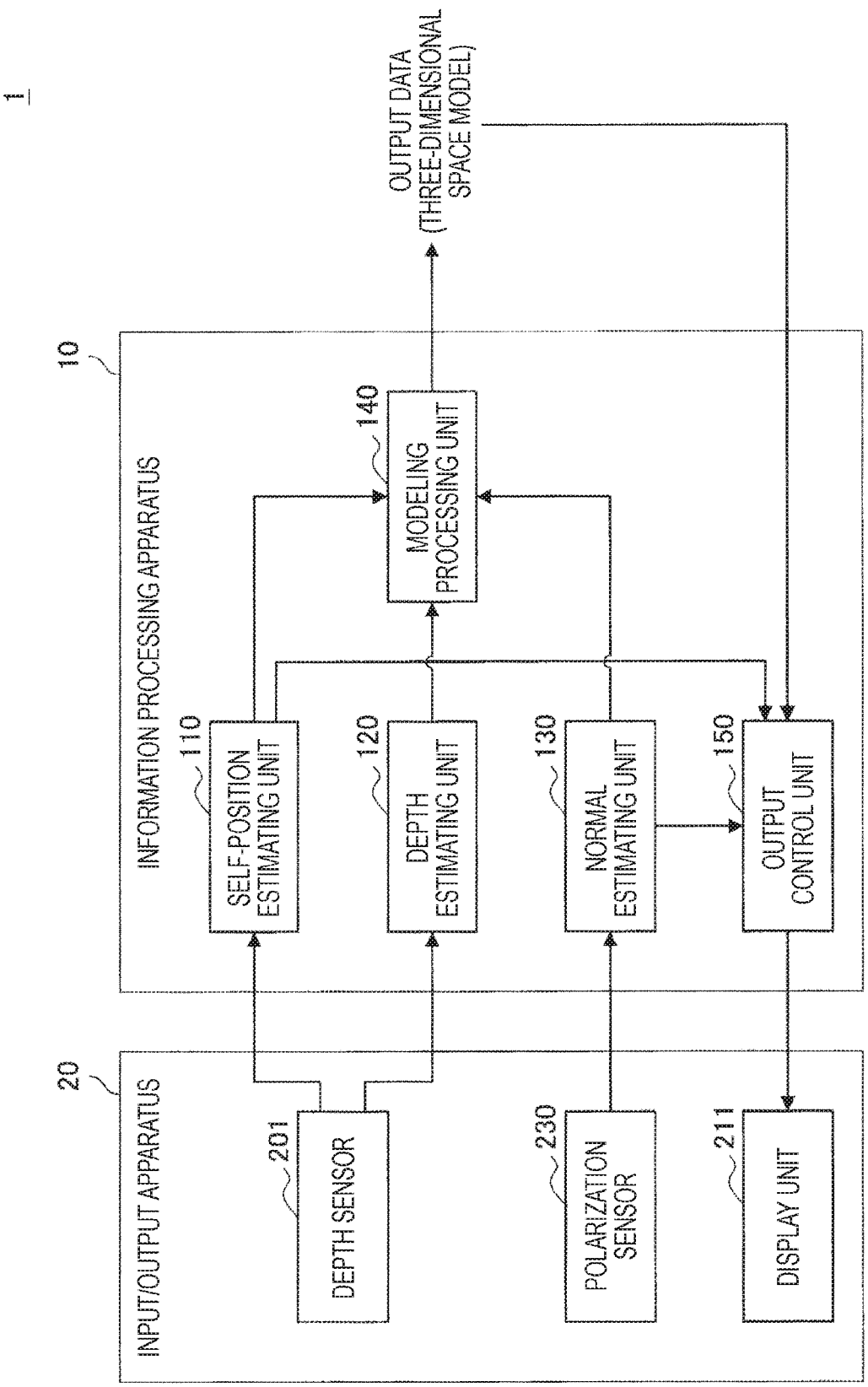
FIG. 5 is a block diagram illustrating an example of a functional configuration of the information processing system according to the embodiment.

First, an example of a functional configuration of the information processing system according to the present embodiment will be described with reference to FIG. 5. FIG. 5 is a block diagram illustrating an example of a functional configuration of the information processing system according to the present embodiment. Note that in the example illustrated in FIG. 5, similarly to the example described with reference to FIG. 1, it will be described that the information processing system 1 includes an input/output apparatus 20 and an information processing apparatus 10. That is, the input/output apparatus 20 and the information processing apparatus 10 illustrated in FIG. 5 correspond to the input/output apparatus 20 and the information processing apparatus 10 illustrated in FIG. 1, respectively. Furthermore, it will be described that the input/output apparatus 20 described with reference to FIG. 2 is applied as the input/output apparatus 20.

As illustrated in FIG. 5, the input/output apparatus 20 includes a depth sensor 201, a polarization sensor 230, and a display unit 211. The depth sensor 201 corresponds to the depth sensor 210 illustrated in FIG. 1 and the image capturing units 201a and 201b illustrated in FIG. 2. Furthermore, the polarization sensor 230 corresponds to the polarization sensor 230 illustrated in FIGS. 1 and 2. Similarly, the display unit 211 corresponds to the display unit 211 illustrated in FIG. 2. As such, the depth sensor 201, the polarization sensor 230, and the display unit 211 have been described above, and a detailed description thereof is thus omitted.

Next, a configuration of the information processing apparatus 10 will be described. As illustrated in FIG. 5, the information processing apparatus 10 includes a self-position estimating unit 110, a depth estimating unit 120, a normal estimating unit 130, a modeling processing unit 140, and an output control unit 150.

The self-position estimating unit 110 estimates a position of the input/output apparatus 20 (particularly, the polarization sensor 230) in a real space. Furthermore, at this time, the self-position estimating unit 110 may estimate a posture of the input/output apparatus 20 in the real space. Note that in the following description, the position and posture of the input/output apparatus 20 in the real space are collectively referred to as a "self-position of the input/output apparatus 20". That is, hereinafter, in a case where the term "self-position of the input/output apparatus 20" is described, it indicates at least the position of the input/output apparatus 20 in the real space, and may also include the posture of the input/output apparatus 20.

Note that as long as the self-position estimating unit 110 can estimate the self-position of the input/output apparatus 20, a technique related to the estimation and a configuration or information used for the estimation are not particularly limited. As a specific example, the self-position estimating unit 110 may estimate the self-position of the input/output apparatus 20 on the basis of the technology called the SLAM described above. In this case, for example, the self-position estimating unit 110 is only required to estimate the self-position of the input/output apparatus 20 on the basis of an acquisition result of depth information by the depth sensor 201 and a detection result of a change in a position or a posture of the input/output apparatus 20 by a predetermined sensor (for example, an acceleration sensor, an angular velocity sensor, or the like).

Furthermore, by calculating a relative positional relationship of the polarization sensor 230 with respect to the input/output apparatus 20 in advance, it is possible to calculate a self-position of the polarization sensor 230 on the basis of an estimation result of the self-position of the input/output apparatus 20.

Then, the self-position estimating unit 110 outputs information indicating the estimation result of the self-position of input/output apparatus 20 (and furthermore, the self-position of polarization sensor 230) to the modeling processing unit 140. Furthermore, the self-position estimating unit 110 may output information corresponding to the estimation result of the self-position of input/output apparatus 20 to the output control unit 150.

The depth estimating unit 120 acquires depth information from the depth sensor 201, and estimates a distance between a predetermined viewpoint (for example, the depth sensor 201) and an object located in the real space on the basis of the acquired depth information. Note that in the following description, it is assumed that the depth estimating unit 120 estimates a distance between the input/output apparatus 20 in which the depth sensor 201 is held (strictly, a predetermined position that becomes a reference in the input/output apparatus 20) and the object located in the real space.

As a specific example, in a case where the depth sensor 201 is configured as a stereo camera, the depth estimating unit 120 estimates a distance between the input/output apparatus 20 and a subject on the basis of a parallax between images captured by each of a plurality of image capturing units (for example, the image capturing units 201a and 201b illustrated in FIGS. 1 and 2) configuring the stereo camera. Furthermore, at this time, the depth estimating unit 120 may generate a depth map in which an estimation result of the distance is mapped on an imaging plane. Then, the depth estimating unit 120 outputs information (for example, the depth map) corresponding to the estimation result of the distance between the input/output apparatus 20 and the object located in the real space to the modeling processing unit 140.

The normal estimating unit 130 acquires a polarization image captured by the polarization sensor 230. The normal estimating unit 130 estimates a geometric structure (for example, a normal) on at least a part of a front surface of the object in the real space captured in the polarization image on the basis of polarization information included in the acquired polarization image. Note that a method of estimating the geometric structure is as described above. Furthermore, in the following description, it is assumed that normal estimating unit 130 estimates the normal on at least a part of a face (for example, the front surface) of the object. Furthermore, at this time, the normal estimating unit 130 may generate a normal map in which an estimation result (that is, normal information) of the normal is mapped to the imaging plane. Then, the normal estimating unit 130 outputs information (for example, the normal map) corresponding to the estimation result of the normal to the modeling processing unit 140. Furthermore, the normal estimating unit 130 may output the information corresponding to the estimation result of the normal to the output control unit 150.

The modeling processing unit 140 acquires the information indicating the estimation result of the self-position of the input/output apparatus 20, from the self-position estimating unit 110. Therefore, the modeling processing unit 140 can recognize the self-position of the input/output apparatus 20. Furthermore, the modeling processing unit 140 acquires the information (for example, the depth map) corresponding to the estimation result of the distance between the input/output apparatus 20 and the object located in the real space, from the depth estimating unit 120. Furthermore, the modeling processing unit 140 acquires the information (for example, the normal map) corresponding to the estimation result of the normal of the face (for example, the front surface) of the object, from the normal estimating unit 130. The modeling processing unit 140 integrates the estimation result of the self-position of the input/output apparatus 20, the estimation result of the distance between the input/output apparatus 20 and the object in the real space, and the estimation result of the normal of the face of the object as a three-dimensional spatial model.

Furthermore, the modeling processing unit 140 may three-dimensionally estimate a position, a posture, a shape, and the like of the object in the real space, for example, on the basis of the three-dimensional space model described above. As a specific example, it is possible to estimate a three-dimensional posture of the face (for example, the front surface) of the object described above on the basis of the estimation result of the normal of the face. Furthermore, it is possible to estimate a relative positional relationship between the input/output apparatus 20 and the object on the basis of the estimation result of the distance between the input/output apparatus 20 and the object. That is, it is possible to estimate a three-dimensional shape of the object described above on the basis of the estimation result of the normal described above and the estimation result of the distance described above. Furthermore, it is possible to convert a relative position of the object described above with respect to the input/output apparatus 20 into a position (absolute position) of the object in the real space by using the estimation result of the self-position of the input/output apparatus 20. In such a manner, the position, the posture, and the shape of the object described above are three-dimensionally estimated. Note that the processing described above is merely an example, and as long as the position, the posture, the shape, and the like of the object in the real space can be three-dimensionally estimated on the basis of acquired various information, the technique is not limited to the example described above.

Furthermore, the self-position estimating unit 110, the depth estimating unit 120, and the normal estimating unit 130 may perform estimation of corresponding various information (that is, the self-position described above, the distance described above, and the normal described above) according to the change in the position or the posture of the input/output apparatus 20 (that is, a change in a position or a posture of a viewpoint). In this case, for example, the modeling processing unit 140 may integrate the various information estimated for every viewpoint as a three-dimensional space model. Furthermore, according to the change in the position or the posture of the input/output apparatus 20 along time series, the various information described above may be estimated along the time series. In this case, for example, the modeling processing unit 140 may integrate the various information as a three-dimensional space model by convoluting the various information estimated along the time series in a time direction. As such, by integrating the various information acquired for each of a plurality of viewpoints (that is, different viewpoints) as the three-dimensional space model, it becomes possible to further improve accuracy related to estimation of the position, the posture, the shape, and the like of the object in the real space (in other words, recognition of the object).

Furthermore, the modeling processing unit 140 may update a three-dimensional space model generated on the basis of information acquired in the past by integrating the newly acquired various information described above into the three-dimensional space model. With such a configuration, it also becomes possible to interpolate information of a part of the three-dimensional space model that has not been observed in the past, on the basis of the newly acquired various information described above.

Furthermore, the modeling processing unit 140 may associate information for discriminating between a region where observation has been performed (that is, a region where the three-dimensional space model is formed) and a region where the observation has not yet been performed, of a region in the real space with the three-dimensional space model, on the basis of the acquired various information described above. As a specific example, the modeling processing unit 140 may set a flag for a part of the three-dimensional space model corresponding to a region where the various information described above are acquired (that is, the region where the observation has been performed). With such a configuration, for example, it becomes possible to discriminate between the region where the observation has already been performed and the region where the observation has not yet been performed on the basis of the flag. In particular, under a situation where a certain object is observed only from some of the directions, observation of a back surface side of the object may not be performed, and a three-dimensional space model may not be formed on the back surface side. Even in such a case, it becomes possible to discriminate between a direction in which observation has been already performed on the object (in other words, a portion where the three-dimensional space model is formed) and a direction in which the observation has not yet been performed on the object (in other words, a portion where the three-dimensional space model is not formed) on the basis of the flag described above. Note that the example described above is merely an example, and as long as it is possible to discriminate between the direction in which the observation has been already performed on the object described above and the direction in which the observation has not yet been performed on the object described above, information set for that reason is not limited to the flag described above. As a specific example, a value calculated by adding a value (for example, a continuous value in the range of 0 to 1) corresponding to the degree of reliability of the polarization normal for every observation may be set instead of the flag described above.

Furthermore, the modeling processing unit 140 may reproduce (simulate) the three-dimensional shape of the object in the real space as a model such as a polygon mesh and the like on the basis of the three-dimensional space model described above. As a specific example, the modeling processing unit 140 may extract a polygon mesh of an object, which is a target, on the basis of the three-dimensional space model described above. As a more specific example, in a case where a truncated signed distance function (TSDF) is used as the three-dimensional space model, it is possible to extract the polygon mesh of the object, which is the target, on the basis of a technique such as, for example, marching cubes, dual contouring, or the like. Furthermore, in a case where the three-dimensional space model is a point group, it is possible to extract the polygon mesh of the object, which is the target, on the basis of a technique such as Poisson surface reconstruction, screened Poisson surface reconstruction, or the like.

Furthermore, the modeling processing unit 140 may output information indicating the estimation result of the position, the posture, the shape, and the like of the object in the real space or data (for example, a three-dimensional space model of a voxel volume and the like) obtained by reproducing the three-dimensional shape of the object in the real space as a model, as output data to a predetermined output destination. As a specific example, the output data may be used by an output control unit 150 as described later in order to present various information to the user.

The output control unit 150 presents the various information to the user through a predetermined output unit. For example, the output control unit 150 may present display information such as a virtual object and the like to the user through the display unit 211 so that the display information is superimposed on the object in the real space, on the basis of the AR technology, according to an estimation result of the position or the posture of the object by the modeling processing unit 140. Furthermore, as another example, the output control unit 150 may present display information (for example, a virtual object) based on the model to the user through the display unit 211 on the basis of the data obtained by reproducing the three-dimensional shape of the object in the real space as the model.

Furthermore, the output control unit 150 may acquire information indicating the estimation result of the normal in at least a part of the face (for example, the front surface) of the object in the real space, and present various information corresponding to the estimation result to the user through a predetermined output unit. As a specific example, in a case where a degree of reliability of the estimation result of the normal (in other words, a degree of reliability of the polarization information) is equal to or less than a threshold, the output control unit 150 may present notification information for prompting (that is, guiding) movement to a position where the degree of reliability is further improved, to the user through a predetermined output unit. At this time, the output control unit 150 may recognize a positional relationship between the input/output apparatus 20 and a part of the face described above on the basis of the estimation result of the self-position of the input/output apparatus 20, and determine a guidance direction according to the positional relationship. Furthermore, as another example, the output control unit 150 may present notification information for prompting (that is, guiding) movement so that indefiniteness of the polarization normal is resolved, to the user through a predetermined output unit. Note that details of processing at the time of presenting the notification information described above will be described later separately.

Note that the functional configuration of the information processing system 1 according to the present embodiment described above is merely an example, and as long as the processing of each configuration described above is realized, the functional configuration of the information processing system 1 is not necessarily limited to the example illustrated in FIG. 5. As a specific example, the input/output apparatus 20 and the information processing apparatus 10 may be configured integrally with each other. Furthermore, as another example, some of each configuration of the information processing apparatus 10 may be provided in an apparatus (for example, the input/output apparatus 20, a server, or the like) different from the information processing apparatus 10. Furthermore, each function of the information processing apparatus 10 may be realized by a plurality of apparatuses operating in cooperation with each other.

Hereinabove, the example of the functional configuration of the information processing system according to the present embodiment has been described with reference to FIG. 5.

<3.2. Guidance Example According to Degree of Reliability of Polarization Normal>

Figure 6:
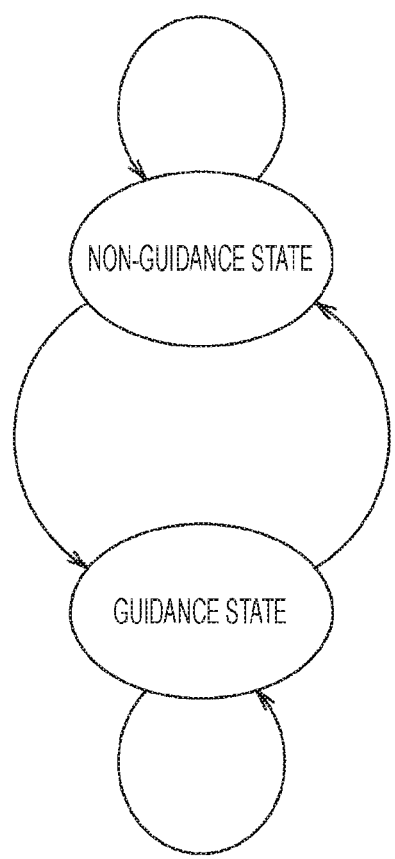
FIG. 6 is an explanatory diagram for describing an overview of an example of processing related to guidance of a user by the information processing system according to the embodiment.

Next, an example of a case of guiding the user so that the degree of reliability of the polarization normal is further improved will be described as an example of guidance of the user by the information processing system according to the present embodiment. For example, FIGS. 6 to 8 are explanatory diagrams for describing an overview of an example of processing related to the guidance of the user by the information processing system according to the present embodiment.

First, a state of processing related to the guidance of the user by the information processing apparatus 10 according to the present embodiment will be described with reference to FIG. 6. FIG. 6 illustrates a schematic state transition diagram of processing related to the guidance of the user by the information processing apparatus 10 according to the present embodiment. As illustrated in FIG. 6, a processing state of the information processing apparatus 10 transitions between a guidance state where the guidance of the user is performed by presenting the notification information to the user and a non-guidance state where the guidance is not performed. Note that an initial state that transitions immediately after the information processing apparatus 10 starts up, or the like, is only required to be set to the non-guidance state. Furthermore, the processing state of the information processing apparatus 10 transitions to another state in a case where a predetermined condition corresponding to the guidance state or the non-guidance state is satisfied in each of the guidance state and the non-guidance state.

Next, an example of a flow of a series of processing in which the information processing apparatus 10 decides whether or not to perform the guidance of the user according to the degree of reliability of the polarization normal (that is, whether or not to transition to the guidance state) and calculates a guidance direction according to a decision result will be described with reference to FIG. 7. FIG. 7 is an explanatory diagram for describing an example of a flow of processing related to the guidance of the user according to the degree of reliability of the polarization normal.

Figure 7:
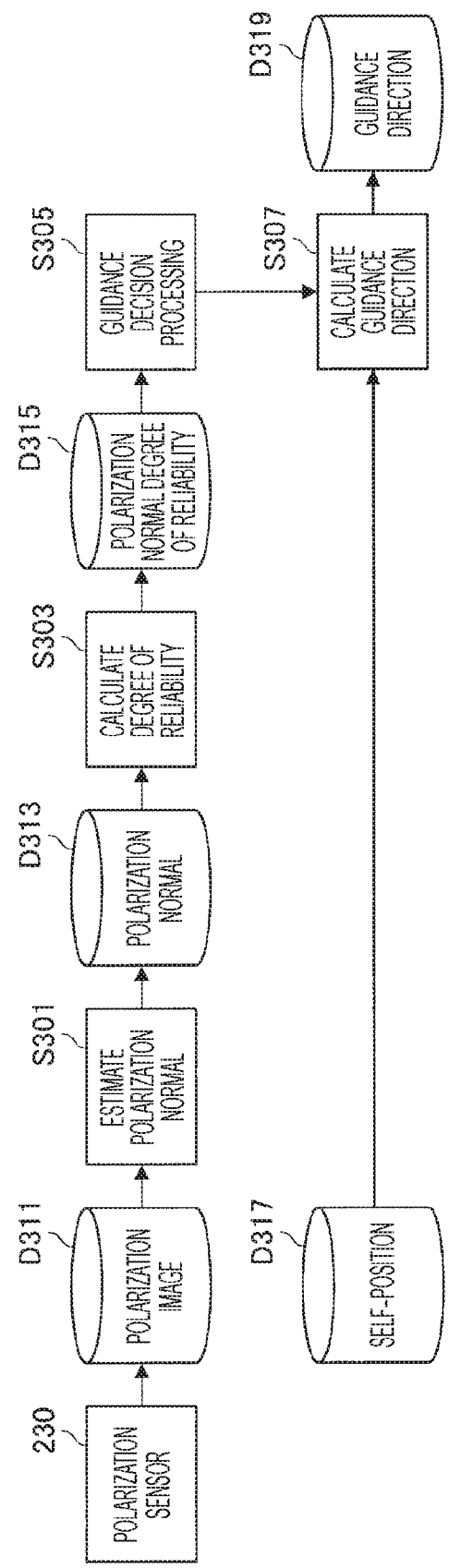
FIG. 7 is an explanatory diagram for describing an overview of an example of processing related to guidance of a user by the information processing system according to the embodiment.
Figure 8:
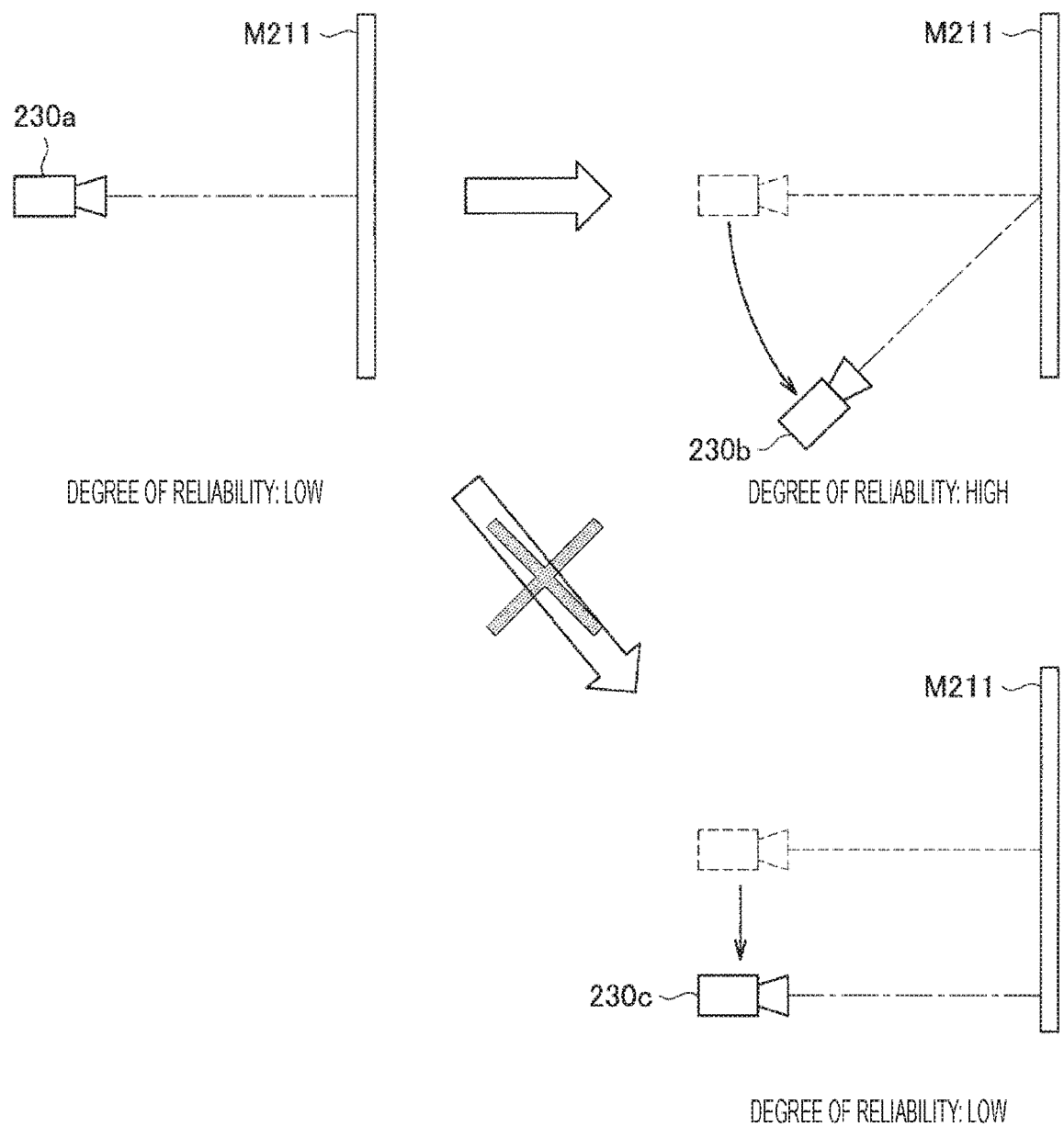
FIG. 8 is an explanatory diagram for describing an overview of an example of processing related to guidance of a user by the information processing system according to the embodiment.

As illustrated in FIG. 7, the information processing apparatus 10 estimates a normal (that is, a polarization normal D313) of a face (for example, a front surface) of an object (that is, an object which is a recognition target) in a real space on the basis of a polarization image D311 (that is, polarization information) acquired by the polarization sensor 230 (S301).

Next, the information processing apparatus 10 calculates a degree of reliability of an estimation result of the polarization normal (hereinafter, referred to as a "polarization normal degree of reliability D315") (S303). The polarization normal degree of reliability D315 may be calculated on the basis of information such as, for example, whether or not a value of a degree of polarization calculated for every pixel of the polarization image D311 or a pixel value (that is, a polarization luminance value) of the pixel is saturated, and the like. Of course, a method of calculating the polarization normal degree of reliability D315 is not necessarily limited as long as the polarization normal degree of reliability D315 (in other words, the degree of reliability of the polarization information) can be calculated.

Next, the information processing apparatus 10 decides whether or not to perform the guidance of the user (that is, whether or not to transition to the guidance state) on the basis of the calculated polarization normal degree of reliability D315 (S305). As a specific example, the information processing apparatus 10 transitions to the guidance state in a case where a predetermined statistic such as an average, a minimum value, or the like of the polarization normal degree of reliability D315 is equal to or less than a threshold in a region where a ratio of the polarization image D311 to an image plane is larger.

In a case where the information processing apparatus 10 has transitioned to the guidance state, the information processing apparatus 10 calculates a guidance direction according to a self-position D317 of the input/output apparatus 20 (S307). At this time, the information processing apparatus 10 calculates a direction for guiding movement of the user so that the polarization sensor 230 is located at a position where the degree of reliability of the polarization normal according to an image capturing result of the polarization image D311 by the polarization sensor 230 becomes higher, for example. Therefore, an example of processing of a case of performing guidance so that the degree of reliability of the polarization normal becomes higher (that is, the degree of polarization becomes higher) will be described in more detail below.

As described above with reference to FIG. 3, a model of specular reflection and a model of diffuse reflection are assumed as a relationship between the degree of polarization and the zenith angle with respect to the normal of the face (for example, the front surface) of the object. For the polarization normal, the zenith angle described above is generally estimated on the basis of the model of diffuse reflection. Therefore, as the zenith angle becomes larger, the degree of polarization tends to become higher. Therefore, the information processing apparatus 10 is only required to perform the guidance so that a region which is a recognition target (hereinafter, also referred to as a "target region") on the face of the object is observed from a viewpoint where the zenith angle described above becomes larger.

For example, FIG. 8 is an explanatory diagram for describing an example of the guidance of the user by the information processing apparatus according to the present embodiment, and illustrates an example of a case of performing the guidance so that the degree of reliability of the polarization normal becomes higher. In FIG. 8, reference numeral M211 schematically denotes a face (for example, a front surface) of an object which is an observation target (that is, a recognition target).

In the example illustrated in FIG. 8, the information processing apparatus 10 performs guidance, for example, on the user so that the user moves horizontally (or vertically) while maintaining a gaze point in a target region so as not to move from at least a part of a field of view of the user (in other words, while maintaining a state where the gaze point is located within a detection range of the polarization sensor 230). Note that the gaze point described above is only required to be determined by calculating, for example, the center of gravity, the center, or the like of the target region on an image. By performing such guidance, for example, as illustrated in FIG. 8, the polarization camera 230 located at a position denoted by reference numeral 230a moves to a position denoted by reference numeral 230b. Therefore, the polarization sensor 230 can observe the face M211 from a position where a zenith angle with respect to a normal of the face M211 becomes larger, such that a degree of polarization of observed polarized light becomes higher, and it becomes thus possible to further improve the degree of reliability of the polarization normal.

In particular, in the example described above, by prompting the user to perform an operation of maintaining the gaze point so as not to move from at least a part of the field of view of the user, it becomes possible to prevent occurrence of a situation where the user performs an operation in which the user moves in parallel with the face M211 while maintaining a state where he/she faces the face M211. That is, in the example illustrated in FIG. 8, in a case where the polarization sensor 230 moves from the position denoted by reference numeral 230a to the position denoted by reference numeral 230c, a state where the polarization sensor 230 and the face M211 face each other is maintained, such that the zenith angle described above does not become large even after the guidance. Therefore, even though such an operation is performed, the degree of polarization of the observed polarized light does not become high, and it becomes difficult to improve the degree of reliability of the polarization normal.

In such a manner, the information processing apparatus 10 calculates a guidance direction D319 for guiding the user, as illustrated in FIG. 7. Then, the information processing apparatus 10 guides the user by notifying the display unit 211 of the input/output apparatus 20 of notification information corresponding to a calculation result of the guidance direction D319, for example. Note that an example of the notification information will be described later in detail separately.

Hereinabove, an example of the case of guiding the user so that the degree of reliability of the polarization normal is further improved has been described as an example of the guidance of the user by the information processing system according to the present embodiment with reference to FIGS. 6 to 8.

<3.3. Guidance Examples for Resolving Indefiniteness of Polarization Normal>

Next, an example of a case of guiding the user so that the indefiniteness of the polarization normal is resolved will be described as another example of guidance of the user by the information processing system according to the present embodiment. For example, FIGS. 9 to 12 are explanatory diagrams for describing an overview of another example of processing related to the guidance of the user by the information processing system according to the present embodiment.

First, an overview of indefiniteness of the polarization normal will be described. In the polarization normal, there is an indefiniteness of 180 degrees in principle. Specifically, at the time of calculation of the polarization normal, in addition to an actual normal (hereinafter, also referred to as a "true normal"), a false normal as opposed to the true normal by 180 degrees with respect to an incident light vector connecting a position of a viewpoint (that is, the polarization sensor 230) from which the polarization information is acquired and a three-dimensional position of a face which is an observation target to each other is calculated as a candidate. At this time, since it is difficult in principle to recognize which of the two calculated candidates for the normal corresponds to the true normal, under a situation where the polarization normal is used for recognition of the object, such indefiniteness may be a constraint in the recognition. That is, depending on a geometric structure of an environment which is an observation target, it may be difficult to correctly recognize the geometric structure due to the indefiniteness of the polarization normal described above.

Figure 9:
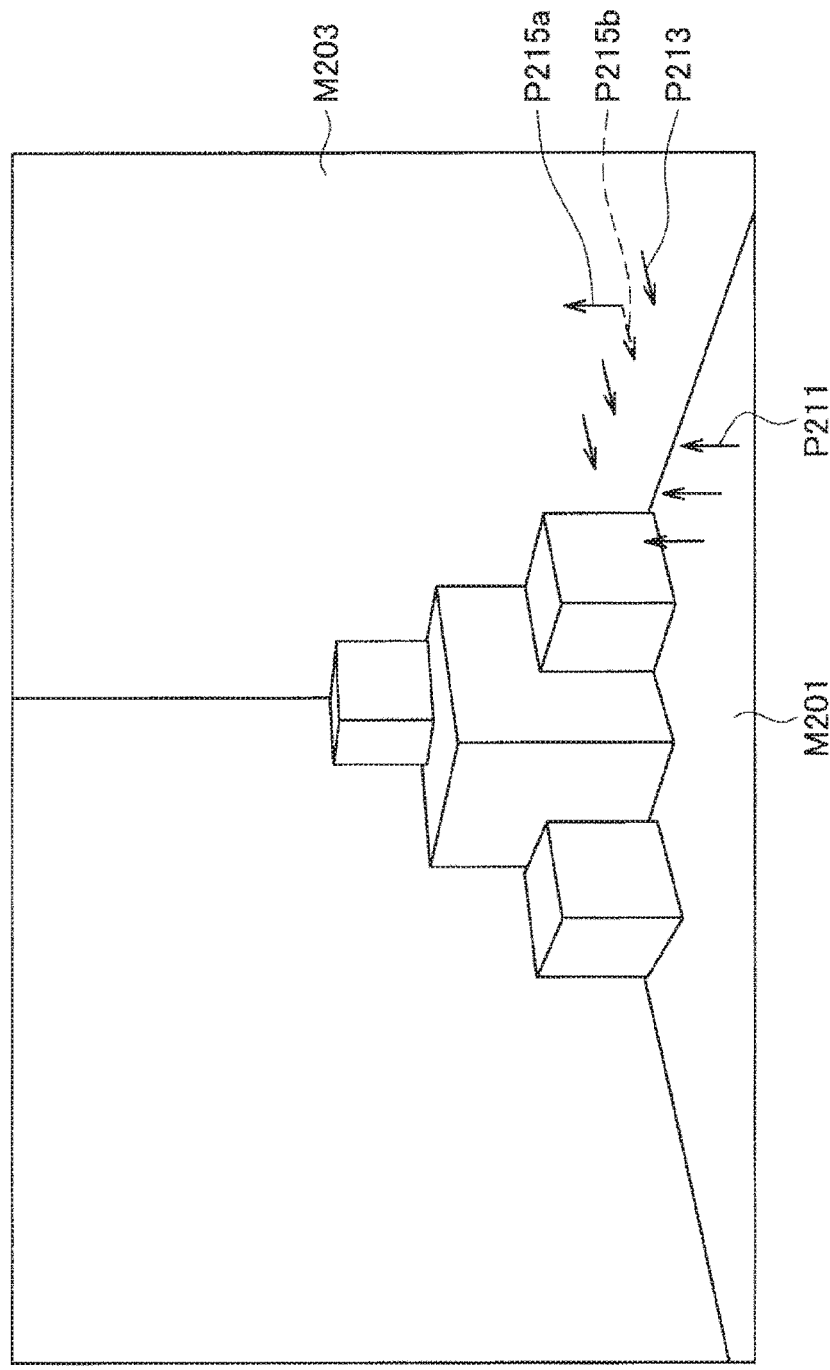
FIG. 9 is an explanatory diagram for describing an overview of another example of processing related to guidance of a user by the information processing system according to the embodiment.

For example, FIG. 9 is an explanatory diagram for describing the indefiniteness of the polarization normal. In the example illustrated in FIG. 9, reference numeral M201 schematically denotes a floor surface provided to extend in a horizontal direction. Furthermore, reference numeral P211 schematically denotes an example of a calculation result of a polarization normal which is a true normal of the floor surface M201. That is, a vector of the polarization normal P211 is directed in a vertical direction (upward direction). Reference numeral M203 schematically denotes a wall surface provided to extend in the vertical direction. Furthermore, reference numeral P213 schematically denotes an example of a calculation result of a polarization normal which is a true normal of the wall surface M203.

On the other hand, reference numerals P215a and P215b schematically denote examples of calculation results of the polarization normal of the wall surface M203 due to the indefiniteness of the polarization normal. Specifically, reference numeral P215a denotes a candidate corresponding to a false normal, of candidates for the polarization normal. Furthermore, reference numeral P215b denotes a candidate corresponding to a true normal, of the candidates for the polarization normal. That is, depending on a positional relationship between the polarization sensor 230, and the floor surface M201 and the wall surface M203, due to the indefiniteness of the polarization normal, the polarization normal (for example, the normal P215a) of the wall surface M203 may be recognized as being directed in a direction substantially equal to that of the polarization normal (that is, the normal P211) of the floor surface M201. That is, in a case where the wall surface M203 is observed by the polarization sensor 230 from a direction in which a zenith angle is 45 degrees with respect to the true normal of the wall surface M203, the false normal is directed in a direction in which the wall surface M203 extends. At this time, in a case where the polarization sensor 230 is observing the wall surface M203 so as to look down from above, the false normal is directed in a vertically upward direction, that is, a direction substantially equal to that of the normal P211 of the floor surface M201, as denoted by reference numeral P215a. Under such a situation, for example, a case where a posture of the wall surface M203 is erroneously recognized can be assumed.

In view of the above situation, an example of guidance for eliminating the above-described indefiniteness of the polarization normal will be described below.

First, an overview of characteristics of the true normal and the false normal calculated in accordance with the indefiniteness of the polarization normal will be described. A direction of the false normal is determined depending on an incident light vector connecting a position of a viewpoint (that is, the polarization sensor 230) from which the polarization information is acquired and a three-dimensional position of a face which is an observation target to each other. Therefore, in a case where a certain region in the real space is observed from a plurality of directions, a direction in the real space indicated by the false normal of the candidates for the normal calculated according to the indefiniteness is not constant, and varies. On the other hand, the true normal always indicates a constant direction, even in a case where it is observed from any direction. That is, it becomes possible to discriminate the true normal and the false normal from each other by using the characteristics as described above. Specifically, it is only sufficient to estimate a direction with the highest frequency as a direction of the true normal by observing a certain object in the real space from a plurality of viewpoints (that is, a plurality of directions) and counting directions of polarization normals calculated for every viewpoint together with candidates (that is, false normals) calculated due to the indefiniteness.

Figure 10:
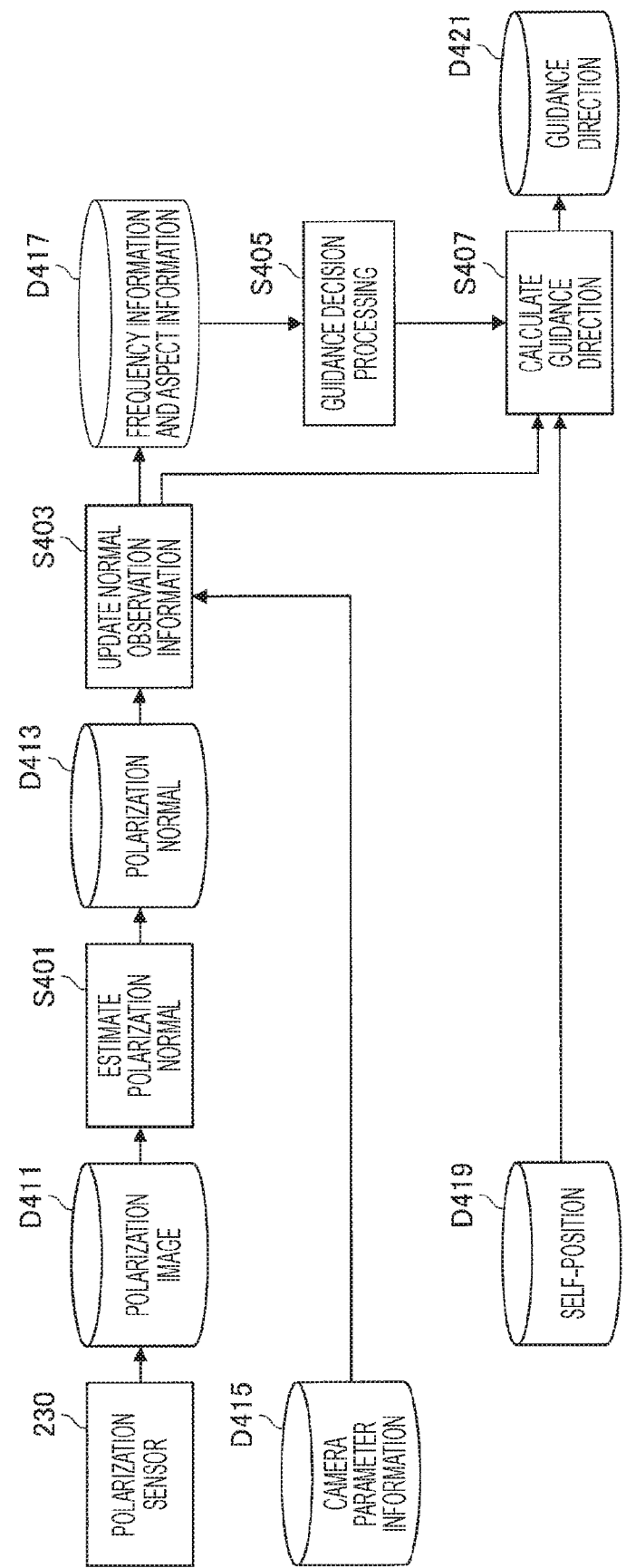
FIG. 10 is an explanatory diagram for describing an overview of another example of processing related to guidance of a user by the information processing system according to the embodiment.

Next, an example of a flow of a series of processing in which the information processing apparatus 10 decides whether or not to perform the guidance of the user according to an observation situation (that is, whether or not the indefiniteness of the polarization normal is resolved) of the object in the real space and calculates a guidance direction according to a decision result will be described with reference to FIG. 10. FIG. 10 is an explanatory diagram for describing an example of a flow of processing related to the guidance of the user for resolving the indefiniteness of the polarization normal. Note that also in the present example, similarly to the example described with reference to FIG. 7, it is assumed that the information processing apparatus 10 can have two states, a non-guidance state and a guidance state.

As illustrated in FIG. 10, the information processing apparatus 10 estimates a normal (that is, a polarization normal D413) of a face of an object (that is, an object which is a recognition target) in a real space on the basis of a polarization image D411 (that is, polarization information) acquired by the polarization sensor 230 (S401).

Next, the information processing apparatus 10 records or updates an observation situation of the polarization normal D413 by the polarization sensor 230 according to an estimation result of the polarization normal D413 and camera parameter information D415 indicating a state of the polarization sensor 230 when the polarization image D411 is acquired (S403). Examples of the camera parameter information D415 can include information indicating a posture of the polarization sensor 230, information (frustum) indicating a range in which the polarization sensor 230 captures the polarization image D411, or the like. Note that the camera parameter information D415 may be calculated on the basis of a self-position D419 of the input/output apparatus 20 holding the polarization sensor 230. Furthermore, information substantially similar to the self-position D419 of the input/output apparatus 20 (that is, a self-position of the polarization sensor 230) may be used as the camera parameter information D415.

Specifically, the information processing apparatus 10 counts directions in which each of the estimated normals is directed, together with candidates (false normals) calculated due to the indefiniteness of the polarization normal, on the basis of the estimation result of the polarization normal D413, and records a counting result as frequency information. Furthermore, at this time, the information processing apparatus 10 may recognize a range in which the frequency information is recorded with the polarization sensor 230 as a base point, on the basis of the camera parameter information D415. Note that information indicating the range can also be converted to information indicating a range corresponding to an absolute position in the real space on the basis of, for example, the self-position D419 of the input/output apparatus 20 (that is, the self-position of the polarization sensor 230).

Furthermore, at this time, the information processing apparatus 10 records, as aspect information, information indicating a direction in which a region (region which is an observation target) in which the polarization normal D413 has been calculated has been observed according to the self-position D419 of the input/output apparatus 20.

Note that the information processing apparatus 10 may record the frequency information and the aspect information described above by setting a flag and the like for information corresponding to a three-dimensional position such as a voxel volume on the basis of the self-position D419 of the input/output apparatus 20, for example. Note that in the following description, the frequency information described above and the aspect information described above are collectively referred to as normal observation information D417. That is, the recorded normal observation information D417 (frequency information and aspect information) indicates the past observation result of the region which is the observation target.

Figure 11:
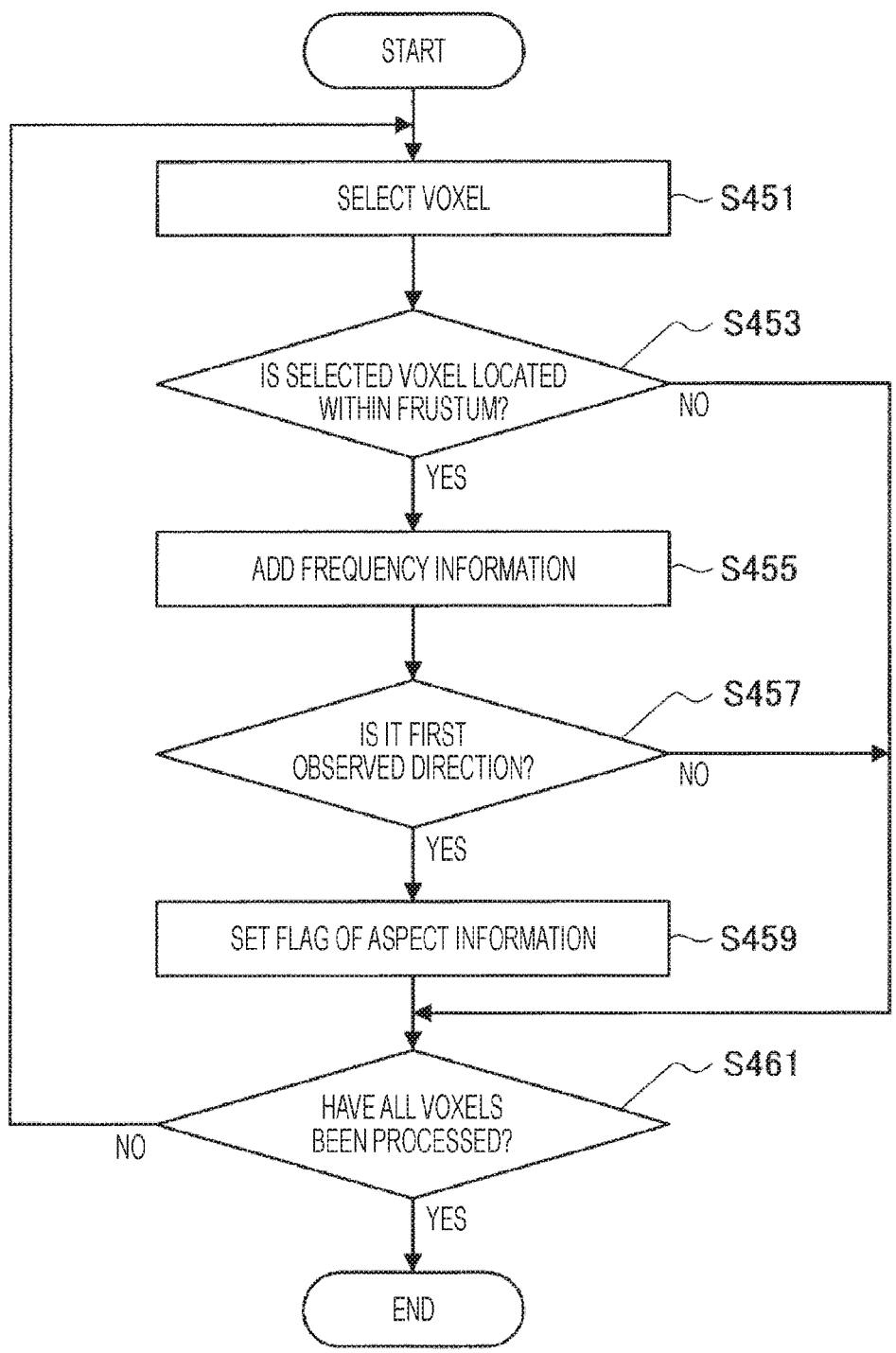
FIG. 11 is an explanatory diagram for describing an overview of another example of processing related to guidance of a user by the information processing system according to the embodiment.

Here, an example of processing related to recording of the normal observation information D417 described above will be described more specifically with reference to FIG. 11. FIG. 11 is a flowchart illustrating an example of processing related to recording of the normal observation information by the information processing apparatus according to the present embodiment.

First, the information processing apparatus 10 selects a voxel, which is a processing target, from a voxel volume obtained by simulating a three-dimensional geometric structure of the real space (S451). The information processing apparatus 10 decides whether or not the selected voxel is located within a frustum of the polarization sensor 230 on the basis of the camera parameter information D415 (S453). Note that in a case where the selected voxel is not located within the frustum of the polarization sensor 230 (S453: NO) and all voxels have not been processed (S461: NO), a new voxel is selected as a processing target from the voxel volume (S451).

In a case where the selected voxel is located within the frustum of the polarization sensor 230 (S453: YES), the information processing apparatus 10 adds frequency information indicating directions in which each polarization normal has been directed according to the self-position D419 of the polarization sensor 230 (S455).

Furthermore, the information processing apparatus 10 decides whether or not an observation direction at that time is a direction in which observation has been first performed among respective directions for observing the voxel (that is, whether or not the observation direction is a direction in which observation has not been performed in the past), according to a setting situation of aspect information for the selected voxel (S457). Note that in a case where the observation direction at that time is a direction in which the observation has been performed in the past (S457: NO) and all the voxels have not been processed (S461: NO), a new voxel is selected as a processing target from the voxel volume (S451).

On the other hand, in a case where the observation direction at that time is the direction in which the observation has not been performed in the past (S459: YES), a flag of the aspect information is set for the voxel according to a positional relationship between the selected voxel and the polarization sensor 230 (S459).

In such a manner, the information processing apparatus 10 performs processing related to updating of the frequency information described above and processing related to setting of the aspect information described above for each voxel as long as processing is not completed for all the voxels (S461: NO). Then, the information processing apparatus 10 ends a series of processing described above in a case where all the voxels have been processed (S461: YES).

In such a manner, the normal observation information D417 (that is, the frequency information and the aspect information) is recorded or updated according to a calculation result of the polarization normal.

Next, as illustrated in FIG. 10, the information processing apparatus 10 decides whether or not to perform the guidance of the user (that is, whether or not to transition to the guidance state) on the basis of the normal observation information D417 (that is, the frequency information and the aspect information) (S405). Specifically, in a case where the acquired frequency information is based on observation information only from a biased direction (for example, a certain direction), a degree of reliability of the calculated polarization normal D413 becomes lower. Therefore, the information processing apparatus 10 may decide how much a direction in which observation is performed is varied, for example, according to the setting situation of the aspect information described above, and decide whether or not to perform the guidance of the user on the basis of a decision result.

As a more specific example, the information processing apparatus 10 may decide whether or not the number of voxels observed from a position spaced apart from a region, which is a modeling target, by a predetermined distance or more is equal to or larger than a threshold, on the basis of aspect information set in association with the region. Furthermore, the information processing apparatus 10 may decide whether or not a difference in the frequency information (that is, a difference in the number of counts) between a plurality of candidates related to a direction of a normal in which the frequency information is recorded or updated for the region is equal to or larger than a threshold. On the basis of the decision as described above, the information processing apparatus 10 judges whether or not the observation has been performed enough to resolve the indefiniteness of the polarization normal, that is, whether or not the observation of the target region has been performed from a plurality of directions to the extent that it is possible to specify the true normal. Then, in a case where the information processing apparatus 10 judges that the observation has not been performed enough, the information processing apparatus 10 may transition to the guidance state. As a more specific example, the information processing apparatus 10 may transition to the guidance state in a case where there is a direction in which the observation has not been performed in the past or in a case where there is a direction in which an observation frequency is lower than those of other directions.

Then, in a case where the information processing apparatus 10 decides that the guidance of the user is to be performed (that is, in a case where the information processing apparatus 10 has transitioned to the guidance state), the information processing apparatus 10 calculates a guidance direction D421 on the basis of the normal observation information D417 and the self-position D419 of the input/output apparatus 20. As a specific example, the information processing apparatus 10 may calculate the guidance direction D421 so that the polarization sensor 230 is located at a position of the viewpoint from which the target region is observed from a direction in which the target region has not been observed in the past, according to the setting situation of the aspect information.

Figure 12:
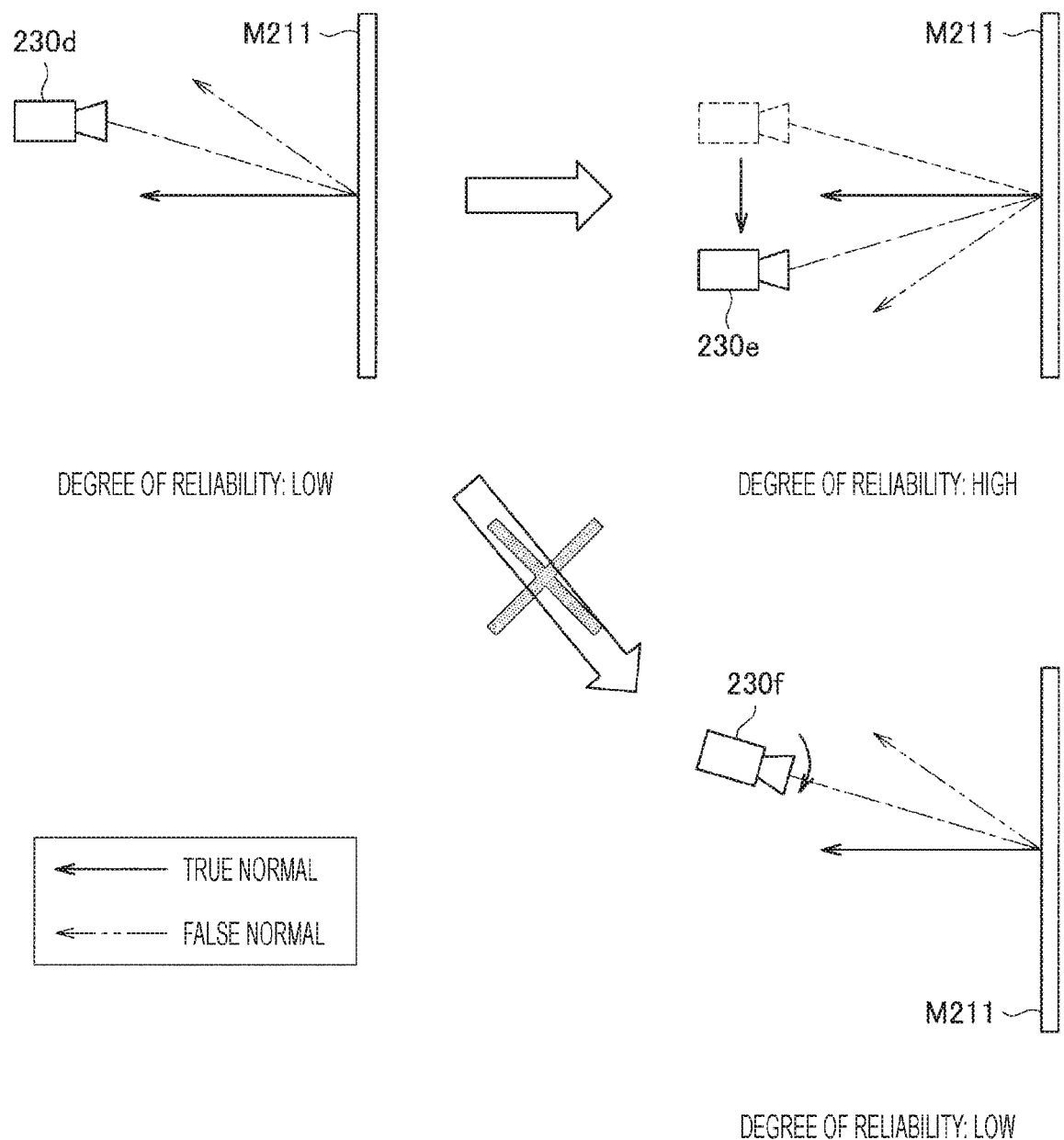
FIG. 12 is an explanatory diagram for describing an overview of another example of processing related to guidance of a user by the information processing system according to the embodiment.

For example, FIG. 12 is an explanatory diagram for describing another example of the guidance of the user by the information processing apparatus according to the present embodiment, and illustrates an example of a case of guiding the user so that the indefiniteness of the polarization normal is resolved. In FIG. 12, reference numeral M211 schematically denotes a face (for example, a front surface) of an object which is an observation target (that is, a recognition target). Furthermore, an arrow denoted by a solid line schematically denotes a direction of a true normal of the face M211. Furthermore, an arrow denoted by a two-dot chain line schematically denotes a direction of a false normal calculated according to the indefiniteness of the polarization normal.

It is difficult to specify which of two calculation results of the polarization normal indicates a true normal, due to the indefiniteness of the polarization normal, for example, only by calculation results of the polarization normal in a case where the polarization sensor 230 is located at a position denoted by reference numeral 230d. On the other hand, for example, when the polarization sensor 230 located at the position denoted by reference numeral 230d moves to a position denoted by reference numeral 230e, as described above, a direction of the true normal does not change, and a direction of the false normal changes, such that it becomes possible to specify the direction of the true normal.

That is, the information processing apparatus 10 is only required to guide the user so that the target region is observed from a direction in which the aspect information is not set on the basis of the setting situation of the aspect information set for the target region.

Note that in a case where only a posture of the polarization sensor 230 changes without changing a position of the polarization sensor 230 as denoted by reference numeral 230f, a calculation result of candidates for the polarization normal does not change. Therefore, in a case where the indefiniteness of the polarization normal is resolved, it is desirable that the guidance is performed so that the position of the polarization sensor 230 changes.

In such a manner, the information processing apparatus 10 calculates the guidance direction D421 for guiding the user, as illustrated in FIG. 10. Then, the information processing apparatus 10 guides the user by notifying the display unit 211 of the input/output apparatus 20 of notification information corresponding to a calculation result of the guidance direction D421, for example. Note that an example of the notification information will be described later in detail separately.

Hereinabove, an example of the case of guiding the user so that the indefiniteness of the polarization normal is resolved has been described as another example of the guidance of the user by the information processing system according to the present embodiment with reference to FIGS. 9 to 12.

<3.4. Example of Notification Information>

Next, an example of notification information given in notification to the user through a predetermined output unit in order for the information processing apparatus according to the present embodiment to guide the user will be described.

(Presentation Example 1 of Notification Information)

Figure 13:
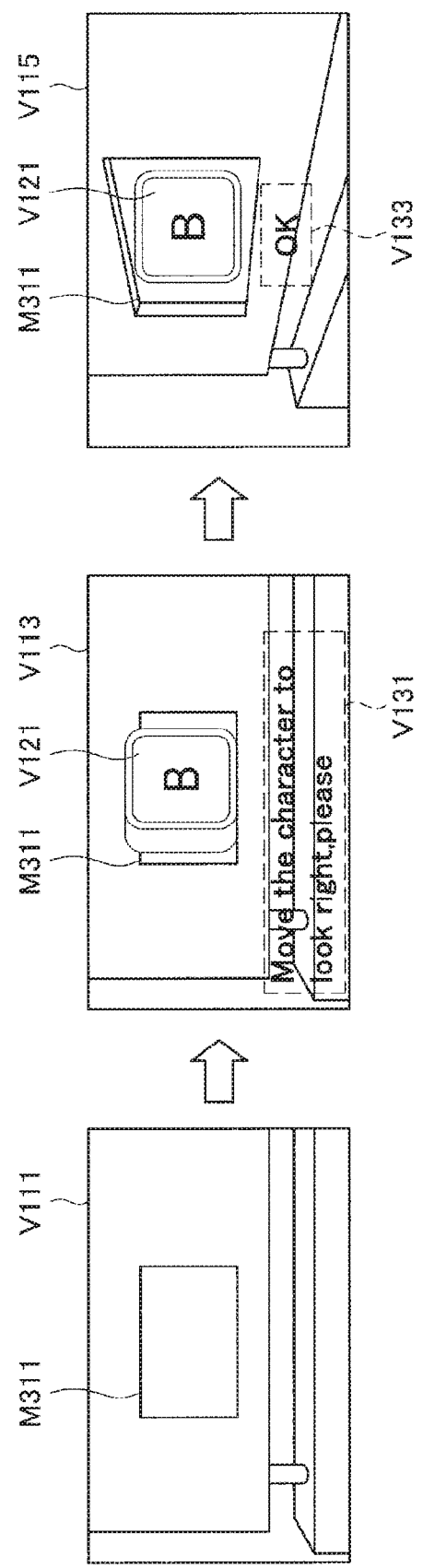
FIG. 13 is an explanatory diagram for describing an example of notification information given in notification to a user in order for an information processing apparatus according to the embodiment to guide the user.

For example, FIG. 13 is an explanatory diagram for describing an example of notification information given in notification to a user in order for the information processing apparatus according to the present embodiment to guide the user, and illustrates an example of notification information presented in order to guide the user so that a target region is observed from different directions.

In FIG. 13, a state denoted by reference numeral V111 schematically indicates a state of an optical image of a real space visually recognized by the user in a situation where the user observes a region (that is, a target region) which is a recognition target (observation target) in the real space. Note that the state V111 indicates a state where the user directly faces a face (hereinafter, referred to as a "target region M311") of an object in the real space. Furthermore, a state denoted by reference numeral V113 schematically indicates a state of an optical image visually recognized by the user in a case where display information (notification information) is superimposed on the target region M311 observed in the state V111 by the information processing apparatus 10. Note that the state V113 corresponds to a state before the user is guided by the notification information presented to the information processing apparatus 10. Furthermore, a state denoted by reference numeral V115 schematically indicates a state of an optical image visually recognized by the user after the user is guided by the information processing apparatus 10.

For example, in the state V111, the information processing apparatus 10 recognizes that a degree of reliability of a polarization normal calculated for the target region M311 (that is, a degree of polarization of polarized light detected by the polarization sensor 230) is low and transitions to the guidance state, because the user directly faces the target region M311. When the information processing apparatus 10 transitions to the guidance state, the information processing apparatus 10 presents notification information V121 and V131 to the user in order to guide the user so that the degree of reliability of the polarization normal calculated for the target region M311 becomes higher.

Specifically, in the state V113, the information processing apparatus 10 presents the notification information V121 to the user so that the notification information V121 is directed in a direction in the real space corresponding to a normal direction of the target region M311 described above and is localized at a position in the real space corresponding to the target region M311. At this time, the notification information V121 is presented so that it is directed from a direction in which a zenith angle with respect to a normal of the target region M311 is equal to or larger than a threshold toward a direction in which the target region M311 is observed, in a case where the user directly faces the notification information V121. Furthermore, in the example illustrated in FIG. 13, the information processing apparatus 10 presents a message prompting the user to move to a position directly facing the notification information V121 as notification information V131 to the user. That is, the information processing apparatus 10 guides the user so that the target region M311 is observed from different directions by presenting the notification information V121 and V131 to the user. Note that the notification information V121 corresponds to an example of "first display information". Furthermore, the notification information V131 corresponds to an example of "second display information".

The user moves according to such guidance by the information processing apparatus 10, such that the target region M311 is observed from a position where the zenith angle with respect to the normal of the target region M311 becomes larger, as indicated as the state V115. That is, a degree of polarization of polarized light detected for the target region M311 becomes high in accordance with the guidance described above, such that a degree of reliability of a calculation result of the polarization normal can be further improved. Furthermore, the user moves according to the guidance described above, such that the target region M311 is observed from directions different from a direction in which the target region M311 is observed in the state V113, as indicated as the state V115. That is, by using observation results of the target region M311 from a plurality of directions in accordance with the guidance described above, it becomes possible to resolve the indefiniteness of the polarization normal.

Note that when the movement of the user is completed according to the guidance, the information processing apparatus 10 may present notification information V133 that notifies the user that the guidance has been completed, to the user. Furthermore, in a case where the guidance is completed, the information processing apparatus 10 may transition to the non-guidance state.

(Presentation Example 2 of Notification Information)

Figure 14:
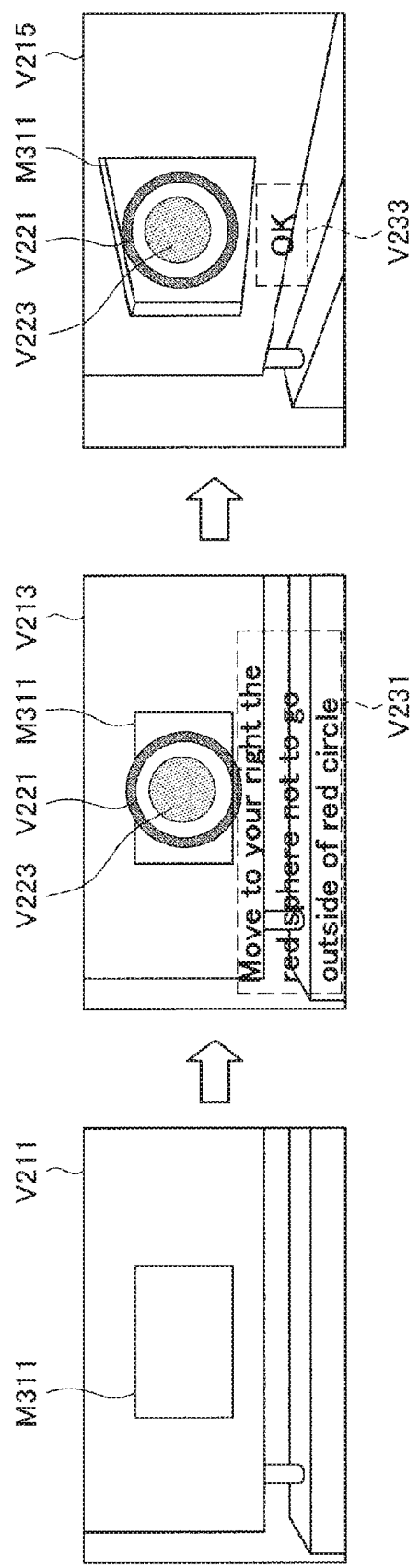
FIG. 14 is an explanatory diagram for describing another example of notification information given in notification to a user in order for an information processing apparatus according to the embodiment to guide the user.

FIG. 14 is an explanatory diagram for describing another example of notification information given in notification to the user in order for the information processing apparatus according to the present embodiment to guide the user, and illustrates an example of notification information presented in order to guide the user so that a target region is observed from different directions.

In FIG. 14, a state denoted by reference numeral V211 schematically indicates a state of an optical image of a real space visually recognized by the user in a situation where the user observes a region which is a recognition target in the real space. Note that the state V211 indicates a state where the user directly faces a target region M311. Furthermore, a state denoted by reference numeral V213 schematically indicates a state of an optical image visually recognized by the user in a case where display information (notification information) is superimposed on the target region M311 observed in the state V211 by the information processing apparatus 10. Note that the state V213 corresponds to a state before the user is guided by the notification information presented to the information processing apparatus 10. Furthermore, a state denoted by reference numeral V125 schematically indicates a state of an optical image visually recognized by the user after the user is guided by the information processing apparatus 10.

Similarly to the state V111 illustrated in FIG. 13, in the state V211, the information processing apparatus 10 recognizes that a degree of reliability of a polarization normal calculated for the target region M311 (that is, a degree of polarization of polarized light detected by the polarization sensor 230) is low and transitions to a guidance state, because the user directly faces the target region M311. When the information processing apparatus 10 transitions to the guidance state, the information processing apparatus 10 presents notification information V221, V223, and V231 to the user in order to guide the user so that the degree of reliability of the polarization normal calculated for the target region M311 becomes higher.

Specifically, in the state V213, the information processing apparatus 10 presents ring-shaped notification information V221 to the user so that the ring-shaped notification information V221 is localized at a position in the real space corresponding to the target region M311. Furthermore, the information processing apparatus 10 presents spherical notification information V223 so as to be localized on an optical axis of the polarization sensor 230 (in other words, in a front surface direction of the input/output apparatus 20). Then, the information processing apparatus 10 presents a message prompting the user to move in a calculated guidance direction (for example, any one of a leftward direction or a rightward direction) to the user as the notification information V231 while maintaining a state where the spherical notification information V223 is located in the ring-shaped notification information V221. That is, the notification information V221 plays a role as an index of a position where a gaze point from a viewpoint of the user is localized. Furthermore, the notification information V223 plays a role of presenting the position of the gaze point from the viewpoint of the user to the user in a visible manner. In such a manner, the information processing apparatus 10 guides the user so that the target region M311 is observed from different directions by presenting the notification information V221, V223, and V231 to the user.

The user moves according to such guidance by the information processing apparatus 10, such that the target region M311 is observed from a position where the zenith angle with respect to the normal of the target region M311 becomes larger, as indicated as the state V215. That is, a degree of polarization of polarized light detected for the target region M311 becomes high in accordance with the guidance described above, such that a degree of reliability of a calculation result of the polarization normal can be further improved. Furthermore, the user moves according to the guidance described above, such that the target region M311 is observed from directions different from a direction in which the target region M311 is observed in the state V213, as indicated as the state V215. That is, by using observation results of the target region M311 from a plurality of directions in accordance with the guidance described above, it becomes possible to resolve the indefiniteness of the polarization normal.

Note that when the movement of the user is completed according to the guidance, the information processing apparatus 10 may present notification information V233 that notifies the user that the guidance has been completed, to the user. Furthermore, in a case where the guidance is completed, the information processing apparatus 10 may transition to the non-guidance state.

Note that the examples of the notification information described above are merely examples and as long as it is possible to guide the user so that improvement of the degree of reliability of the polarization normal or resolution of the indefiniteness of the polarization normal can be realized, an aspect of the notification information is not necessarily limited to the examples described above with reference to FIGS. 13 and 14.

Furthermore, an example in which the display information is presented to the user as the notification information has been described in the examples described above, but a type of the notification information is not particularly limited as long as the user can be guided as described above. As a specific example, the notification information may be presented as a voice, a sound, or the like. Furthermore, as another example, the notification information may be presented as a tactile sense or a force sense (so-called haptics) simulated by vibration and the like.

Hereinabove, the examples of the notification information given in notification to the user through the predetermined output unit in order for the information processing apparatus according to the present embodiment to guide the user have been described with reference to FIGS. 13 and 14.

<<4. Hardware Configuration>>

Figure 15:
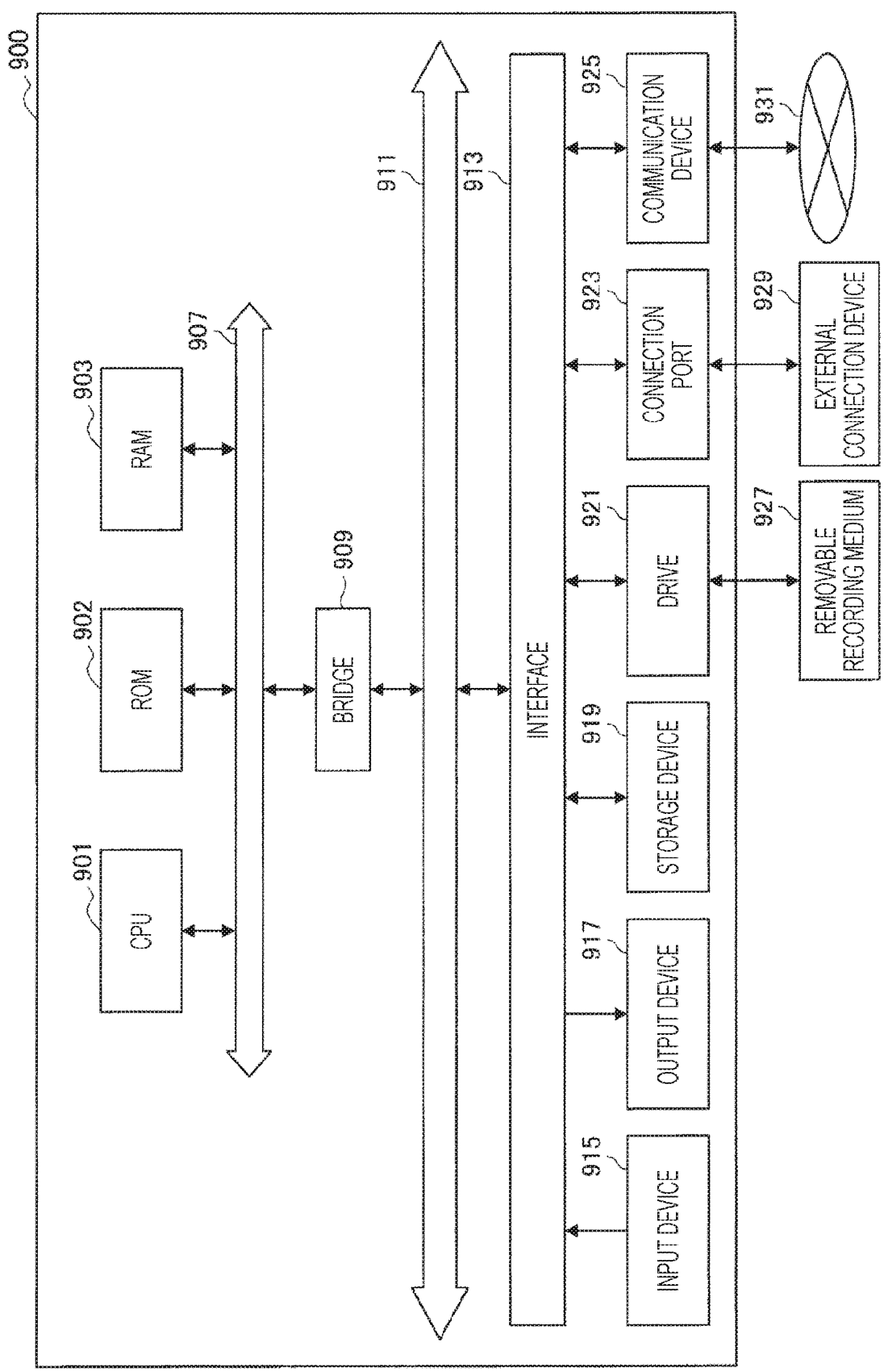
FIG. 15 is a functional block diagram illustrating a configuration example of a hardware configuration of an information processing apparatus configuring the information processing system according to an embodiment of the present disclosure.

Next, an example of a hardware configuration of an information processing apparatus configuring the information processing system according to the embodiment of the present disclosure, such as the information processing apparatus 10 described above, will be described in detail with reference to FIG. 15. FIG. 15 is a functional block diagram illustrating a configuration example of a hardware configuration of an information processing apparatus configuring the information processing system according to the embodiment of the present disclosure.

An information processing apparatus 900 configuring the information processing system according to the present embodiment mainly includes a CPU 901, a ROM 902, and a RAM 903. Furthermore, the information processing apparatus 900 further includes a host bus 907, a bridge 909, an external bus 911, an interface 913, an input device 915, an output device 917, a storage device 919, a drive 921, a connection port 923, and a communication device 925.

The CPU 901 functions as an arithmetic processing device and a control device, and controls all or some of operations in the information processing apparatus 900 according to various programs recorded in the ROM 902, the RAM 903, the storage device 919, or a removable recording medium 927. The ROM 902 stores programs, operation parameters, or the like used by the CPU 901. The RAM 903 primarily stores programs used by the CPU 901, parameters that appropriately change during execution of the programs, or the like. The CPU 901, the ROM 902, and the RAM 903 are connected to each other by the host bus 907 including an internal bus such as a CPU bus and the like. For example, the self-position estimating unit 110, the depth estimating unit 120, the normal estimating unit 130, the modeling processing unit 140, and the output control unit 150 illustrated in FIG. 5 can be configured by the CPU 901.

The host bus 907 is connected to the external bus 911 such as a peripheral component interconnect/interface (PCI) bus and the like through the bridge 909. Furthermore, the input device 915, the output device 917, the storage device 919, the drive 921, the connection port 923, and the communication device 925 are connected to the external bus 911 through the interface 913.

The input device 915 is, for example, an operation means operated by the user, such as a mouse, a keyboard, a touch panel, a button, a switch, a lever, a pedal, and the like. Furthermore, the input device 915 may be, for example, a remote control means (so-called a remote control) using infrared rays or other electric waves, or may be an external connection device 929 such as a mobile phone, a PDA, or the like corresponding to an operation of the information processing apparatus 900. Moreover, the input device 915 may include, for example, an input control circuit or the like that generates an input signal on the basis of information input by the user using the operation means described above and outputs the generated input signal to the CPU 901. The user of the information processing apparatus 900 can input various data to the information processing apparatus 900 or instruct the information processing apparatus 900 to perform a processing operation by operating the input device 915.

The output device 917 is a device that can visually or auditorily notify the user of acquired information. Such a device includes a display device such as a CRT display device, a liquid crystal display device, a plasma display device, an EL display device, a lamp, or the like, a voice output device such as a speaker, a headphone, or the like, a printer device, or the like. The output device 917 outputs, for example, results obtained by various processing performed by the information processing apparatus 900. Specifically, the display device displays results obtained by the various processing performed by the information processing apparatus 900 by texts or images. On the other hand, the voice output device converts an audio signal including reproduced voice data, sound data, or the like into an analog signal and outputs the analog signal. For example, the display unit 211 illustrated in FIG. 5 can be configured by the output device 917.

The storage device 919 is a device for data storage configured as an example of a storage unit of the information processing apparatus 900. The storage device 919 is configured by, for example, a magnetic storage unit device such as a hard disk drive (HDD) and the like, a semiconductor storage device, an optical storage device, a magneto-optical storage device, or the like. The storage device 919 stores programs executed by the CPU 901, various data, or the like.

The drive 921 is a reader/writer for a recording medium, and is embedded in or externally mounted on the information processing apparatus 900. The drive 921 reads information recorded in the removable recording medium 927 such as a magnetic disk, optical disk, magneto-optical disk, semiconductor memory, or the like, that is mounted, and outputs the read information to the RAM 903. Furthermore, the drive 921 can also write a record to the removable recording medium 927 such as the magnetic disk, the optical disk, the magneto-optical disk, the semiconductor memory, or the like, that is mounted. The removable recording medium 927 is, for example, a DVD medium, a HD-DVD medium, a Blu-ray (registered trademark) medium, or the like. Furthermore, the removable recording medium 927 may be a CompactFlash (registered trademark) (CF), a flash memory, a secure digital (SD) memory card, or the like. Furthermore, the removable recording medium 927 may be, for example, an integrated circuit (IC) card on which a non-contact type IC chip is mounted, an electronic device, or the like.

The connection port 923 is a port for directly connecting to the information processing apparatus 900. Examples of the connection port 923 include a universal serial bus (USB) port, an IEEE1394 port, a small computer system interface (SCSI) port, and the like. Other examples of the connection port 923 include an RS-232C port, an optical audio terminal, a high-definition multimedia interface (HDMI) (registered trademark) port, and the like. By connecting the external connection device 929 to the connection port 923, the information processing apparatus 900 acquires various data directly from the external connection device 929 or provides various data to the external connection device 929.

The communication device 925 is, for example, a communication interface including a communication device or the like for connecting to a communication network 931. The communication device 925 is, for example, a communication card and the like for wired or wireless local area network (LAN), Bluetooth (registered trademark), or wireless USB (WUSB). Furthermore, the communication device 925 may be a router for optical communication, a router for asymmetric digital subscriber line (ADSL), modems for various communication, or the like. The communication device 925 can transmit and receive a signal and the like, for example, to or from the Internet or another communication device according to a predetermined protocol such as, for example, TCP/IP and the like. Furthermore, the communication network 931 connected to the communication device 925 includes a network and the like connected in a wired or wireless manner, and may be, for example, the Internet, a home LAN, an infrared communication, a radio wave communication, a satellite communication, or the like.

Hereinabove, the example of the hardware configuration capable of realizing functions of the information processing apparatus 900 configuring the information processing system according to the embodiment of the present disclosure has been described. Each component described above may be configured using a general-purpose member or may be configured by hardware specialized for the function of each component. Therefore, it is possible to appropriately change the hardware configuration to be used according to a technical level at the time of carrying out the present embodiment. Note that although not illustrated in FIG. 15, various configurations corresponding to the information processing apparatus 900 configuring the information processing system are naturally provided.

Note that a computer program for realizing each function of the information processing apparatus 900 configuring the information processing system according to the present embodiment as described above can be created and mounted in a personal computer (PC) and the like. Furthermore, a computer readable recording medium in which such a computer program is stored can be provided. The computer readable recording medium is, for example, a magnetic disk, an optical disk, a magneto-optical disk, a flash memory, and the like. Furthermore, the computer program described above may be distributed through, for example, a network without using the computer readable recording medium. Furthermore, the number of computers that execute the computer program is not particularly limited. For example, a plurality of computers (for example, a plurality of servers and the like) may execute the computer program in cooperation with each other.

<<5. End>>

As described above, the information processing apparatus according to the present embodiment estimates the normal on at least a part of the face of the object in the real space on the basis of the polarization information corresponding to the detection result of each of the plurality of beams of polarized light acquired by the polarization sensor and having different polarization directions. Furthermore, the information processing apparatus performs control so that the notification information for performing the guidance so that the position of the polarization sensor described above in the real space changes is given in notification (that is, controls an output of the notification information), according to the estimation result of the normal described above. As a specific example, the information processing apparatus performs control so that the notification information for performing the guidance so that the angle (that is, the zenith angle with respect to the normal described above) formed by the direction of the normal of the face described above and the direction corresponding to the vector extending from the polarization sensor described above to the face becomes larger is given in notification.

With the control as described above, it becomes possible to guide the user so that the polarization sensor moves to a position where the degree of polarization of the polarized light detected by the polarization sensor is further improved, for example, with at least a part of the face of the object in the real space as the target region. Furthermore, by performing the guidance so that the target region is observed from a plurality of different directions, it also becomes possible to solve the indefiniteness of the polarization normal. That is, according to the information processing system according to the present embodiment, it becomes possible to acquire the information used for recognizing the object in the real space in a more suitable manner by guiding the user as described above.

Hereinabove, the preferred embodiments of the present disclosure have been described in detail with reference to the accompanying drawings, but the technical scope of the present disclosure is not limited to such embodiments. It will be apparent to those skilled in the art of the present disclosure that various modifications or alterations can be conceived within the scope of the technical idea described in the claims, and it is naturally understood that these modifications or alterations also fall within the technical scope of the present disclosure.

Note that in the example described above, a description has been given focusing on an example of a case where the technology according to the present disclosure is applied to realization of AR or VR, but an application destination of the technology is not necessarily limited. That is, it is possible to apply the technology according to the present disclosure if a situation where the guidance is performed so that the polarization information can be acquired in a more suitable manner by the polarization sensor 230 is required, as described above. Furthermore, an example in which the glasses-type wearable device is applied as the input/output apparatus 20 has been described hereinabove, but as long as it is possible to realize the function of the system according to the present embodiment described above, a configuration of the input/output apparatus 20 is not limited. As a specific example, a terminal apparatus configured to be portable, such as a smartphone and the like may be applied as the input/output apparatus 20. Furthermore, a configuration of an apparatus applied as the input/output apparatus 20 may be appropriately changed according to the application destination of the technology according to the present disclosure.

Furthermore, the effects described in the present specification are only illustrative or exemplary rather than being restrictive. That is, the technology according to the present disclosure can accomplish other effects apparent to those skilled in the art from the description of the present specification, in addition to or instead of the effects described above.

Note that the following configurations also fall within the technical scope of the present disclosure.

(1)

An information processing apparatus including:

an estimating unit that estimates a normal on at least a part of a face of an object in a real space on the basis of polarization information corresponding to a detection result of each of a plurality of beams of polarized light acquired by a polarization sensor and having different polarization directions; and a control unit that controls output of notification information for guiding a change in a position in the real space according to an estimation result of the normal.

(2)

The information processing apparatus according to the above (1), in which the controller acquires position information according to an estimation result of a position of the polarization sensor in the real space, and performs control to output the notification information according to the position information and the estimation result of the normal.

(3)

The information processing apparatus according to the above (1) or (2), in which the notification information is information for performing guidance so that a state where the object is located within at least a part of a detection range of the polarization sensor is maintained and a position of the polarization sensor in the real space is changed.

(4)

The information processing apparatus according to the above (3), in which the notification information is information for performing guidance so that the face is located on an optical axis of the polarization sensor.

(5)

The information processing apparatus according to the above (1) or (2), in which the notification information is information for performing guidance so that the face is observed from different directions.

(6)

The information processing apparatus according to any one of the above (1) to (5), in which the notification information is display information for performing the guidance.

(7)

The information processing apparatus according to the above (6), in which the display information includes information that is an index for localizing a gaze point from a predetermined viewpoint in at least a part of a region of the face.

(8)

The information processing apparatus according to the above (6), in which the display information includes first display information and second display information for performing guidance so that a user directly faces the first display information, and the control unit presents the first display information in a state of superimposing the first display information on the face so that the first display information is directed in a direction in the real space according to the estimation result of the normal.

(9)

The information processing apparatus according to any one of the above (1) to (8), in which the control unit performs control so that the notification information is output, the notification information performing guidance so that an angle formed by a direction of the normal of the face and a direction corresponding to a vector extending from the polarization sensor to the face becomes larger.

(10)

The information processing apparatus according to any one of the above (1) to (8), in which the control unit controls the output of the notification information according to a degree of reliability of the estimation result of the normal.

(11)

The information processing apparatus according to the above (10), in which the control unit controls the output of the notification information for guiding movement to a direction in which the degree of reliability becomes higher.

(12)

The information processing apparatus according to the above (10) or (11), in which the control unit controls the output of the notification information in a case where the degree of reliability is equal to or less than a threshold.

(13)

The information processing apparatus according to any one of the above (1) to (8), in which the control unit controls the output of the notification information according to the past observation result of the face.

(14)

The information processing apparatus according to the above (13), in which the control unit performs control so that the notification information is output, the notification information guiding movement to a direction in which observation of the face has not been performed in the past among respective directions for the face.

(15)

The information processing apparatus according to the above (13) or (14), in which the control unit controls the output of the notification information in a case where there is a direction in which observation of the face has not been performed in the past among respective directions for the face.

(16)

An information processing method, by a computer, including:

estimating a normal on at least a part of a face of an object in a real space on the basis of polarization information corresponding to a detection result of each of a plurality of beams of polarized light acquired by a polarization sensor and having different polarization directions; and controlling output of notification information for guiding a change in a position in the real space according to an estimation result of the normal.

(17)

A recording medium in which a program is recorded, the program for causing a computer to execute:

estimating a normal on at least a part of a face of an object in a real space on the basis of polarization information corresponding to a detection result of each of a plurality of beams of polarized light acquired by a polarization sensor and having different polarization directions; and controlling output of notification information for guiding a change in a position in the real space according to an estimation result of the normal.

REFERENCE SIGNS LIST

1 Information processing system
10 Information processing apparatus
100 Information processing apparatus
109 Normal estimating unit
110 Self-position estimating unit
120 Depth estimating unit
130 Normal estimating unit
140 Output control unit
140 Modeling processing unit
150 Output control unit
20 Input/output apparatus
201 Depth sensor
201a Image capturing unit
201b Image capturing unit
203a Image capturing unit
203b Image capturing unit
207 Operation unit
210 Depth sensor
211 Display unit
230 Polarization sensor
291 Holding unit
293a Lens
293b Lens

The invention claimed is:

1. An information processing apparatus, comprising:
circuitry configured to:
estimate a normal on at least a part of a face of an object in a real space based on polarization information, wherein
the polarization information corresponds to a detection result of each of a plurality of beams of polarized light acquired by a polarization sensor, and
the plurality of beams have different polarization directions; and
control output of notification information, wherein the output of the notification information is controlled to guide a change in a position of the polarization sensor in the real space based on the estimated normal;
acquire position information of the changed position of the polarization sensor in the real space based on the estimated normal; and
control output of the notification information based on the acquired position information and the estimated normal.

2. The information processing apparatus according to claim 1, wherein the notification information is information to:
maintain a state where the object is located within at least a part of a detection range of the polarization sensor, and
change the position of the polarization sensor in the real space.

3. The information processing apparatus according to claim 2, wherein the notification information is information to locate the face of the object on an optical axis of the polarization sensor.

4. The information processing apparatus according to claim 1, wherein the notification information is information to observe the face of the object from different directions.

5. The information processing apparatus according to claim 1, wherein the notification information is display information for the guidance.

6. The information processing apparatus according to claim 5, wherein the display information includes information that is an index for localizing a gaze point from a specific viewpoint in at least a part of a region of the face of the object.

7. The information processing apparatus according to claim 5, wherein
the display information includes first display information and second display information for guidance so that a user directly faces the first display information, and
the circuitry is further configured to present the first display information in a state that superimposes the first display information on the face of the object, wherein the superimposed first display information is directed in a direction in the real space based the estimated normal.

8. The information processing apparatus according to claim 1, wherein the notification information executes guidance so that an angle between a direction of the normal of the face and a direction corresponding to a vector extending from the polarization sensor to the face becomes larger.

9. The information processing apparatus according to claim 1, wherein the circuitry is further configured to control the output of the notification information based on a degree of reliability of the estimated normal.

10. The information processing apparatus according to claim 9, wherein the circuitry is further configured to control the output of the notification information to guide movement of the polarization sensor to a direction in which the degree of reliability becomes higher.

11. The information processing apparatus according to claim 9, wherein the circuitry is further configured to control the output of the notification information when the degree of reliability is equal to or less than a threshold.

12. The information processing apparatus according to claim 1, wherein the circuitry is further configured to control the output of the notification information based on a past observation result of the face.

13. The information processing apparatus according to claim 12, wherein the notification information is information that guides movement of the polarization sensor to a direction, in which observation of the face of the object has not been executed in past, among respective directions for the face of the object.

14. The information processing apparatus according to claim 12, wherein the circuitry is further configured to control the output of the notification information based on presence of a direction, in which observation of the face of the object has not been performed in past, among respective directions for the face of the object.

15. An information processing method, comprising:
   estimating a normal on at least a part of a face of an object in a real space based on polarization information, wherein
      the polarization information corresponds to a detection result of each of a plurality of beams of polarized light acquired by a polarization sensor, and
      the plurality of beams have different polarization directions;
   controlling output of notification information, wherein the output of the notification information is controlled to guide a change in a position of the polarization sensor in the real space based on the estimated normal;
   acquiring position information of the changed position of the polarization sensor in the real space based on the estimated normal; and
   controlling output of the notification information based on the acquired position information and the estimated normal.

16. A non-transitory computer-readable medium having stored thereon, computer-executable instructions which, when executed by a computer, cause the computer to execute operations, the operations comprising:
   estimating a normal on at least a part of a face of an object in a real space based on polarization information, wherein
      the polarization information corresponds to a detection result of each of a plurality of beams of polarized light acquired by a polarization sensor, and
      the plurality of beams have different polarization directions;
   controlling output of notification information, wherein the output of the notification information is controlled to guide a change in a position of the polarization sensor in the real space based on the estimated normal;
   acquiring position information of the changed position of the polarization sensor in the real space based on the estimated normal; and
   controlling output of the notification information based on the acquired position information and the estimated normal.

* * * * *